(12) United States Patent
Boulware et al.

(10) Patent No.: US 10,475,353 B2
(45) Date of Patent: Nov. 12, 2019

(54) SYSTEM FOR CHARACTERIZING MANUAL WELDING OPERATIONS ON PIPE AND OTHER CURVED STRUCTURES

(71) Applicant: Lincoln Global, Inc., Santa Fe Springs, CA (US)

(72) Inventors: Paul C. Boulware, Columbus, OH (US); Douglas Alan Clark, Columbus, OH (US); Christopher C. Conrardy, Columbus, OH (US); Jeremy Michael Green, Mount Sterling, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 15/953,994

(22) Filed: Apr. 16, 2018

(65) Prior Publication Data

US 2018/0233065 A1 Aug. 16, 2018

Related U.S. Application Data

(63) Continuation of application No. 14/827,657, filed on Aug. 17, 2015, now abandoned.
(Continued)

(51) Int. Cl.
*B23K 9/095* (2006.01)
*B23K 9/127* (2006.01)
(Continued)

(52) U.S. Cl.
CPC ............ *G09B 19/24* (2013.01); *B23K 9/0026* (2013.01); *B23K 9/0953* (2013.01);
(Continued)

(58) Field of Classification Search
CPC .... B23K 9/0026; B23K 9/0953; B23K 9/095; B23K 9/0956; B23K 9/127; B23K 37/02;
(Continued)

(56) References Cited

U.S. PATENT DOCUMENTS

| 317,063 A | 5/1885 | Wittenstrom |
| 428,459 A | 5/1890 | Coffin |

(Continued)

FOREIGN PATENT DOCUMENTS

| CA | 2698078 | 9/2011 |
| CN | 1665633 | 9/2005 |

(Continued)

OTHER PUBLICATIONS

SIMFOR / CESOL, "RV-Sold" Welding Simulator, Technical and Functional Features, 20 pages, date unknown.
(Continued)

*Primary Examiner* — Michael A Laflame, Jr.
(74) *Attorney, Agent, or Firm* — Calfee, Halter & Griswold LLP

(57) ABSTRACT

A system for characterizing manual welding exercises and providing valuable training to welders that includes components for generating, capturing, and processing data. The data generating component further includes a fixture, workpiece, at least one calibration device having at least two point markers integral therewith, and a welding tool. The data capturing component further includes an imaging system for capturing images of the point markers and the data processing component is operative to receive information from the data capturing component and perform various position and orientation calculations.

19 Claims, 13 Drawing Sheets

Related U.S. Application Data

(60) Provisional application No. 62/055,724, filed on Sep. 26, 2014.

(51) Int. Cl.
  *B23K 37/02* (2006.01)
  *B23K 37/04* (2006.01)
  *G09B 19/24* (2006.01)
  *B23K 9/00* (2006.01)
  *B23K 9/32* (2006.01)

(52) U.S. Cl.
  CPC .......... *B23K 9/0956* (2013.01); *B23K 9/1278* (2013.01); *B23K 9/32* (2013.01); *B23K 37/0426* (2013.01)

(58) Field of Classification Search
  CPC ....... B23K 37/04–0417; B23K 37/0426–0461; G09B 19/24
  See application file for complete search history.

(56) References Cited

U.S. PATENT DOCUMENTS

| | | |
|---|---|---|
| 483,428 A | 9/1892 | Goppin |
| 1,159,119 A | 11/1915 | Springer |
| 1,286,529 A | 12/1918 | Cave |
| 2,326,944 A | 8/1943 | Holand |
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson |
| 3,654,421 A | 4/1972 | Streetman |
| 3,690,020 A | 9/1972 | McBratnie |
| 3,739,140 A | 6/1973 | Rotilio |
| 3,852,917 A * | 12/1974 | McKown ............. B23D 45/124 266/54 |
| 3,866,011 A | 2/1975 | Cole |
| 3,867,769 A | 2/1975 | Schow |
| 3,904,845 A | 9/1975 | Minkiewicz |
| 3,988,913 A | 11/1976 | Metcalfe |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros |
| 4,280,041 A | 7/1981 | Kiessling |
| 4,280,137 A | 7/1981 | Ashida |
| 4,314,125 A | 2/1982 | Nakamura |
| 4,354,087 A | 10/1982 | Osterlitz |
| 4,359,622 A | 11/1982 | Dostoomian |
| 4,375,026 A | 2/1983 | Kearney |
| 4,410,787 A | 10/1983 | Kremers |
| 4,429,266 A | 1/1984 | Traadt |
| 4,452,589 A | 6/1984 | Denison |
| D275,292 S | 8/1984 | Bouman |
| D277,761 S | 2/1985 | Korovin |
| 4,525,619 A | 6/1985 | Ide |
| D280,329 S | 8/1985 | Bouman |
| 4,555,614 A | 11/1985 | Morris et al. |
| 4,611,111 A | 9/1986 | Baheti |
| 4,616,326 A | 10/1986 | Meier |
| 4,629,860 A | 12/1986 | Lindborn |
| 4,677,277 A | 6/1987 | Cook |
| 4,680,014 A | 7/1987 | Paton |
| 4,689,021 A | 8/1987 | Vasiliev |
| 4,707,582 A | 11/1987 | Beyer |
| 4,716,273 A | 12/1987 | Paton |
| D297,704 S | 9/1988 | Bulow |
| 4,812,614 A | 3/1989 | Wang |
| 4,867,685 A | 9/1989 | Brush |
| 4,877,940 A | 10/1989 | Bangs |
| 4,897,521 A | 1/1990 | Burr |
| 4,907,973 A | 3/1990 | Hon |
| 4,931,018 A | 6/1990 | Herbst |
| 4,973,814 A | 11/1990 | Kojima |
| 4,998,050 A | 3/1991 | Nishiyama |
| 5,034,593 A | 7/1991 | Rice |
| 5,061,841 A | 10/1991 | Richardson |
| 5,089,914 A | 2/1992 | Prescott |
| 5,192,845 A | 3/1993 | Kirmsse |
| 5,206,472 A | 4/1993 | Myking |
| 5,266,930 A | 11/1993 | Ichikawa |
| 5,283,418 A | 2/1994 | Bellows |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming |
| 5,360,156 A | 11/1994 | Ishizaka |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb |
| 5,436,638 A | 7/1995 | Bolas |
| 5,464,957 A | 11/1995 | Kidwell |
| 5,465,037 A | 11/1995 | Huissoon |
| D365,583 S | 12/1995 | Viken |
| 5,493,093 A | 2/1996 | Cecil |
| 5,547,052 A | 8/1996 | Latshaw |
| 5,562,843 A | 10/1996 | Yasumoto |
| 5,662,822 A | 9/1997 | Tada |
| 5,670,071 A | 9/1997 | Tomoyuki |
| 5,676,503 A | 10/1997 | Lang |
| 5,676,867 A | 10/1997 | Van Allen |
| 5,708,253 A | 1/1998 | Bloch |
| 5,710,405 A | 1/1998 | Solomon |
| 5,719,369 A | 2/1998 | White |
| D392,534 S | 3/1998 | Degen |
| 5,728,991 A | 3/1998 | Takada |
| 5,751,258 A | 5/1998 | Fergason |
| D395,296 S | 6/1998 | Kaya |
| 5,774,110 A | 6/1998 | Edelson |
| D396,238 S | 7/1998 | Schmitt |
| 5,781,258 A | 7/1998 | Debral |
| 5,823,785 A | 10/1998 | Matherne |
| 5,835,077 A | 11/1998 | Dao |
| 5,835,277 A | 11/1998 | Hegg |
| 5,845,053 A | 12/1998 | Watanabe |
| 5,877,777 A | 3/1999 | Colwell |
| 5,963,891 A | 10/1999 | Walker |
| 6,008,470 A | 12/1999 | Zhang |
| 6,037,948 A | 3/2000 | Liepa |
| 6,049,059 A | 4/2000 | Kim |
| 6,051,805 A | 4/2000 | Vaidya |
| 6,114,645 A | 9/2000 | Burgess |
| 6,155,475 A | 12/2000 | Ekelof |
| 6,155,928 A | 12/2000 | Burdick |
| 6,230,327 B1 | 5/2001 | Briand |
| 6,236,013 B1 | 5/2001 | Delzenne |
| 6,236,017 B1 | 5/2001 | Smartt |
| 6,242,711 B1 | 6/2001 | Cooper |
| 6,271,500 B1 | 8/2001 | Hirayam |
| 6,301,763 B1 | 10/2001 | Pryor |
| 6,330,938 B1 | 12/2001 | Herve |
| 6,330,966 B1 | 12/2001 | Eissfeller |
| 6,331,848 B1 | 12/2001 | Stove |
| D456,428 S | 4/2002 | Aronson |
| 6,373,465 B2 | 4/2002 | Jolly |

(56) References Cited

U.S. PATENT DOCUMENTS

| | | |
|---|---|---|
| 6,377,011 B1 | 4/2002 | Ben-Ur |
| D456,828 S | 5/2002 | Aronson |
| 6,396,232 B2 | 5/2002 | Haanpaa |
| D461,383 S | 8/2002 | Blackburn |
| 6,427,352 B1 | 8/2002 | Pfeiffer |
| 6,441,342 B1 | 8/2002 | Hsu |
| 6,445,964 B1 | 9/2002 | White |
| 6,492,618 B1 | 12/2002 | Flood |
| 6,506,997 B2 | 1/2003 | Matsuyama |
| 6,552,303 B1 | 4/2003 | Blankenship |
| 6,560,029 B1 | 5/2003 | Dobbie |
| 6,563,489 B1 | 5/2003 | Latypov |
| 6,568,846 B1 | 5/2003 | Cote |
| D475,726 S | 6/2003 | Suga |
| 6,572,379 B1 | 6/2003 | Sears |
| 6,583,386 B1 | 6/2003 | Ivkovich |
| 6,593,540 B1 | 7/2003 | Baker |
| 6,621,049 B2 | 9/2003 | Suzuki |
| 6,624,388 B1 | 9/2003 | Blankenship |
| D482,171 S | 11/2003 | Vui |
| 6,647,288 B2 | 11/2003 | Madill |
| 6,649,858 B2 | 11/2003 | Wakeman |
| 6,655,645 B1 | 12/2003 | Lu |
| 6,660,965 B2 | 12/2003 | Simpson |
| 6,679,702 B1 | 1/2004 | Rau |
| 6,697,701 B2 | 2/2004 | Hillen |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship |
| 6,715,502 B1 | 4/2004 | Rome |
| D490,347 S | 5/2004 | Meyers |
| 6,730,875 B2 | 5/2004 | Hsu |
| 6,734,393 B1 | 5/2004 | Friedl |
| 6,744,011 B1 | 6/2004 | Hu |
| 6,750,428 B2 | 6/2004 | Okamoto |
| 6,765,584 B1 | 7/2004 | Matthias |
| 6,772,802 B2 | 8/2004 | Few |
| 6,788,442 B1 | 9/2004 | Potin |
| 6,795,778 B2 | 9/2004 | Dodge |
| 6,798,974 B1 | 9/2004 | Nakano |
| 6,857,553 B1 | 2/2005 | Hartman |
| 6,858,817 B2 | 2/2005 | Blankenship |
| 6,865,926 B2 | 3/2005 | O'Brien |
| D504,449 S | 4/2005 | Butchko |
| 6,920,371 B2 | 7/2005 | Hillen |
| 6,940,039 B2 | 9/2005 | Blankenship |
| 6,982,700 B2 | 1/2006 | Rosenberg |
| 7,021,937 B2 | 4/2006 | Simpson |
| 7,024,342 B1 | 4/2006 | Waite |
| 7,110,859 B2 | 9/2006 | Shibata |
| 7,126,078 B2 | 10/2006 | Demers |
| 7,132,617 B2 | 11/2006 | Lee |
| 7,170,032 B2 | 1/2007 | Flood |
| 7,194,447 B2 | 3/2007 | Harvey |
| 7,233,837 B2 | 6/2007 | Swain |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily |
| D561,973 S | 2/2008 | Kinsley |
| 7,353,715 B2 | 4/2008 | Myers |
| 7,363,137 B2 | 4/2008 | Brant |
| 7,375,304 B2 | 5/2008 | Kainec |
| 7,381,923 B2 | 6/2008 | Gordon |
| 7,414,595 B1 | 8/2008 | Muffler |
| 7,465,230 B2 | 12/2008 | Lemay |
| 7,474,760 B2 | 1/2009 | Hertzman |
| 7,478,108 B2 | 1/2009 | Townsend |
| D587,975 S | 3/2009 | Aronson |
| 7,487,018 B2 | 4/2009 | Lee |
| 7,516,022 B2 | 4/2009 | Lee |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender |
| 7,643,890 B1 | 1/2010 | Hillen |
| 7,687,741 B2 | 3/2010 | Kainec |
| D614,217 S | 4/2010 | Peters |
| D615,573 S | 5/2010 | Peters |
| 7,817,162 B2 | 10/2010 | Bolick |
| 7,853,645 B2 | 12/2010 | Brown |
| D631,074 S | 1/2011 | Peters |
| 7,874,921 B2 | 1/2011 | Baszucki |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear |
| 8,248,324 B2 | 8/2012 | Nangle |
| 8,265,886 B2 | 9/2012 | Bisiaux |
| 8,274,013 B2 | 9/2012 | Wallace |
| 8,287,522 B2 | 10/2012 | Moses |
| 8,292,723 B2 | 10/2012 | DeWaal |
| 8,301,286 B2 | 10/2012 | Babu |
| 8,316,462 B2 | 11/2012 | Becker |
| 8,363,048 B2 | 1/2013 | Gering |
| 8,365,603 B2 | 2/2013 | Lesage |
| 8,512,043 B2 | 8/2013 | Choquet |
| 8,569,646 B2 | 10/2013 | Daniel |
| 8,657,605 B2 | 2/2014 | Wallace |
| 8,680,434 B2 | 3/2014 | Stoger |
| 8,692,157 B2 | 4/2014 | Daniel |
| 8,747,116 B2 | 6/2014 | Zboray |
| 8,777,629 B2 | 7/2014 | Kreindl |
| 8,787,051 B2 | 7/2014 | Chang |
| 8,834,168 B2 | 9/2014 | Peters |
| 8,851,896 B2 | 10/2014 | Wallace |
| 8,911,237 B2 | 12/2014 | Postlewaite |
| 8,915,740 B2 | 12/2014 | Zboray |
| RE45,398 E | 3/2015 | Wallace |
| 8,992,226 B1 | 3/2015 | Leach |
| 9,011,154 B2 | 4/2015 | Kindig |
| 9,293,056 B2 | 3/2016 | Zboray |
| 9,293,057 B2 | 3/2016 | Zboray |
| 9,779,635 B2 | 10/2017 | Zboray |
| 9,836,987 B2 | 12/2017 | Postlewaite |
| 2001/0045808 A1 | 11/2001 | Hietmann |
| 2001/0052893 A1 | 12/2001 | Jolly |
| 2002/0032553 A1 | 3/2002 | Simpson |
| 2002/0039138 A1 | 4/2002 | Edelson |
| 2002/0046999 A1 | 4/2002 | Veikkolainen |
| 2002/0005421 A1 | 5/2002 | Edelson |
| 2002/0050984 A1 | 5/2002 | Roberts |
| 2002/0085843 A1 | 7/2002 | Mann |
| 2002/0094026 A1 | 7/2002 | Edelson |
| 2002/0098468 A1 | 7/2002 | Barrett |
| 2002/0111557 A1 | 8/2002 | Madill |
| 2002/0132213 A1 | 9/2002 | Grant |
| 2002/0135695 A1 | 9/2002 | Edelson |
| 2002/0175897 A1 | 11/2002 | Pelosi |
| 2002/0178038 A1 | 11/2002 | Grybas |
| 2002/0180761 A1 | 12/2002 | Edelson |
| 2003/0000931 A1 | 1/2003 | Ueda |
| 2003/0002740 A1 | 1/2003 | Melikian |
| 2003/0023592 A1 | 1/2003 | Modica |
| 2003/0025884 A1 | 2/2003 | Hamana |
| 2003/0062354 A1 | 4/2003 | Ward |
| 2003/0075534 A1 | 4/2003 | Okamoto |
| 2003/0106787 A1 | 6/2003 | Santilli |
| 2003/0111451 A1 | 6/2003 | Blankenship |
| 2003/0172032 A1 | 9/2003 | Choquet |
| 2003/0186199 A1 | 10/2003 | McCool |
| 2003/0228560 A1 | 12/2003 | Seat |
| 2003/0234885 A1 | 12/2003 | Pilu |
| 2004/0009462 A1 | 1/2004 | McElwrath |
| 2004/0020907 A1 | 2/2004 | Zauner |
| 2004/0035990 A1 | 2/2004 | Ackeret |
| 2004/0050824 A1 | 3/2004 | Samler |
| 2004/0088071 A1 | 5/2004 | Kouno |
| 2004/0140301 A1 | 7/2004 | Blankenship |
| 2004/0167788 A1 | 8/2004 | Birimisa |
| 2004/0181382 A1 | 9/2004 | Hu |

(56) References Cited

U.S. PATENT DOCUMENTS

| | | |
|---|---|---|
| 2005/0007504 A1 | 1/2005 | Fergason |
| 2005/0017152 A1 | 1/2005 | Fergason |
| 2005/0029326 A1 | 2/2005 | Henrikson |
| 2005/0046584 A1 | 3/2005 | Breed |
| 2005/0050168 A1 | 3/2005 | Wen |
| 2005/0101767 A1 | 5/2005 | Clapham |
| 2005/0103766 A1 | 5/2005 | Iizuka |
| 2005/0103767 A1 | 5/2005 | Kainec |
| 2005/0103768 A1 | 5/2005 | Ward |
| 2005/0109735 A1 | 5/2005 | Flood |
| 2005/0128186 A1 | 6/2005 | Shahoian |
| 2005/0133488 A1 | 6/2005 | Blankenship |
| 2005/0159840 A1 | 7/2005 | Lin |
| 2005/0163364 A1 | 7/2005 | Beck |
| 2005/0189336 A1 | 9/2005 | Ku |
| 2005/0199602 A1 | 9/2005 | Kaddani |
| 2005/0230573 A1 | 10/2005 | Ligertwood |
| 2005/0233295 A1 | 10/2005 | Chiszar |
| 2005/0252897 A1 | 11/2005 | Hsu |
| 2005/0275913 A1 | 12/2005 | Vesely |
| 2005/0275914 A1 | 12/2005 | Vesely |
| 2006/0014130 A1 | 1/2006 | Weinstein |
| 2006/0076321 A1 | 4/2006 | Maev |
| 2006/0136183 A1 | 6/2006 | Choquet |
| 2006/0140502 A1 | 6/2006 | Tseng |
| 2006/0154226 A1 | 7/2006 | Maxfield |
| 2006/0163227 A1 | 7/2006 | Hillen |
| 2006/0163228 A1 | 7/2006 | Daniel |
| 2006/0166174 A1 | 7/2006 | Rowe |
| 2006/0169682 A1 | 8/2006 | Kainec |
| 2006/0173619 A1 | 8/2006 | Brant |
| 2006/0189260 A1 | 8/2006 | Sung |
| 2006/0207980 A1 | 9/2006 | Jacovetty |
| 2006/0213892 A1 | 9/2006 | Ott |
| 2006/0214924 A1 | 9/2006 | Kawamoto |
| 2006/0226137 A1 | 10/2006 | Huismann |
| 2006/0241432 A1 | 10/2006 | Herline |
| 2006/0252543 A1 | 11/2006 | Van Noland |
| 2006/0258447 A1 | 11/2006 | Baszucki |
| 2007/0034611 A1 | 2/2007 | Drius |
| 2007/0038400 A1 | 2/2007 | Lee |
| 2007/0045488 A1 | 3/2007 | Shin |
| 2007/0088536 A1 | 4/2007 | Ishikawa |
| 2007/0112889 A1 | 5/2007 | Cook |
| 2007/0164007 A1 | 7/2007 | Peters et al. |
| 2007/0188606 A1 | 8/2007 | Atkinson |
| 2007/0198117 A1 | 8/2007 | Wajihuddin |
| 2007/0211026 A1 | 9/2007 | Ohta |
| 2007/0221797 A1 | 9/2007 | Thompson |
| 2007/0256503 A1 | 11/2007 | Wong |
| 2007/0264620 A1 | 11/2007 | Maddix |
| 2007/0277611 A1 | 12/2007 | Portzgen |
| 2007/0291035 A1 | 12/2007 | Vesely |
| 2008/0021311 A1 | 1/2008 | Goldbach |
| 2008/0027594 A1 | 1/2008 | Jump |
| 2008/0031774 A1 | 2/2008 | Magnant |
| 2008/0038702 A1 | 2/2008 | Choquet |
| 2008/0061049 A1 | 3/2008 | Albrecht |
| 2008/0078811 A1 | 4/2008 | Hillen |
| 2008/0078812 A1 | 4/2008 | Peters |
| 2008/0107345 A1 | 5/2008 | Melikian |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer |
| 2008/0140815 A1 | 6/2008 | Brant |
| 2008/0149686 A1 | 6/2008 | Daniel |
| 2008/0203075 A1 | 8/2008 | Feldhausen |
| 2008/0233550 A1 | 9/2008 | Solomon |
| 2008/0249998 A1 | 10/2008 | Dettinger |
| 2008/0303197 A1 | 12/2008 | Paquette |
| 2008/0314887 A1 | 12/2008 | Stoger |
| 2009/0015585 A1 | 1/2009 | Klusza |
| 2009/0021514 A1 | 1/2009 | Klusza |
| 2009/0045183 A1 | 2/2009 | Artelsmair |
| 2009/0050612 A1 | 2/2009 | Serruys |
| 2009/0057286 A1 | 3/2009 | Ihara |
| 2009/0109128 A1 | 4/2009 | Nangle |
| 2009/0152251 A1 | 6/2009 | Dantinne |
| 2009/0173726 A1 | 7/2009 | Davidson |
| 2009/0184098 A1 | 7/2009 | Daniel |
| 2009/0197228 A1 | 8/2009 | Afshar |
| 2009/0200281 A1 | 8/2009 | Hampton |
| 2009/0200282 A1 | 8/2009 | Hampton |
| 2009/0231423 A1 | 9/2009 | Becker |
| 2009/0257655 A1 | 10/2009 | Melikian |
| 2009/0259444 A1 | 10/2009 | Dolansky |
| 2009/0298024 A1 | 12/2009 | Batzler |
| 2009/0312958 A1 | 12/2009 | Dai |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace |
| 2010/0062405 A1 | 3/2010 | Zboray |
| 2010/0062406 A1 | 3/2010 | Zboray |
| 2010/0096373 A1 | 4/2010 | Hillen |
| 2010/0121472 A1 | 5/2010 | Babu |
| 2010/0133247 A1 | 6/2010 | Mazumder |
| 2010/0133250 A1 | 6/2010 | Sardy |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper |
| 2010/0299101 A1 | 11/2010 | Shimada |
| 2010/0307249 A1 | 12/2010 | Lesage |
| 2010/0314362 A1 | 12/2010 | Albrecht |
| 2010/0326962 A1* | 12/2010 | Calla ............... B23K 9/0956 219/76.14 |
| 2011/0006047 A1 | 1/2011 | Penrod |
| 2011/0048273 A1 | 3/2011 | Colon |
| 2011/0052046 A1 | 3/2011 | Melikian |
| 2011/0060568 A1 | 3/2011 | Goldfine |
| 2011/0082728 A1 | 4/2011 | Melikian |
| 2011/0091846 A1 | 4/2011 | Kreindl |
| 2011/0114615 A1 | 5/2011 | Daniel |
| 2011/0116076 A1 | 5/2011 | Chantry |
| 2011/0117527 A1 | 5/2011 | Conrardy |
| 2011/0122495 A1 | 5/2011 | Togashi |
| 2011/0183304 A1 | 7/2011 | Wallace |
| 2011/0187746 A1 | 8/2011 | Suto |
| 2011/0187859 A1 | 8/2011 | Edelson |
| 2011/0229864 A1 | 9/2011 | Short |
| 2011/0248864 A1 | 10/2011 | Becker |
| 2011/0316516 A1 | 12/2011 | Schiefermuller |
| 2012/0122062 A1 | 5/2012 | Yang et al. |
| 2012/0189993 A1 | 7/2012 | Kindig |
| 2012/0291172 A1 | 11/2012 | Wills |
| 2012/0298640 A1 | 11/2012 | Conrardy |
| 2013/0026150 A1 | 1/2013 | Chantry |
| 2013/0040270 A1 | 2/2013 | Albrecht |
| 2013/0049976 A1 | 2/2013 | Maggiore |
| 2013/0075380 A1 | 3/2013 | Albrech |
| 2013/0119040 A1 | 5/2013 | Suraba |
| 2013/0170259 A1 | 7/2013 | Chang |
| 2013/0182070 A1 | 7/2013 | Peters |
| 2013/0183645 A1 | 7/2013 | Wallace |
| 2013/0189657 A1 | 7/2013 | Wallace |
| 2013/0189658 A1 | 7/2013 | Peters |
| 2013/0203029 A1 | 8/2013 | Choquet |
| 2013/0206740 A1 | 8/2013 | Pfeifer |
| 2013/0209976 A1 | 8/2013 | Postlethwaite |
| 2013/0230832 A1 | 9/2013 | Peters |
| 2013/0231980 A1 | 9/2013 | Choquet |
| 2013/0252214 A1 | 9/2013 | Eigart |
| 2013/0288211 A1 | 10/2013 | Patterson |
| 2013/0327747 A1 | 12/2013 | Dantinne |
| 2013/0342678 A1 | 12/2013 | McAninch |
| 2014/0017642 A1 | 1/2014 | Postlethwaite et al. |
| 2014/0038143 A1 | 2/2014 | Daniel |
| 2014/0042136 A1 | 2/2014 | Daniel |
| 2014/0065584 A1 | 3/2014 | Wallace et al. |
| 2014/0134580 A1 | 5/2014 | Becker |
| 2014/0263224 A1 | 9/2014 | Becker |

(56) References Cited

U.S. PATENT DOCUMENTS

| | | |
|---|---|---|
| 2014/0272835 A1 | 9/2014 | Becker |
| 2014/0272836 A1* | 9/2014 | Becker .................. G09B 19/24 434/234 |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056584 A1 | 2/2015 | Boulware |
| 2015/0056585 A1 | 2/2015 | Boulware |
| 2015/0056586 A1 | 2/2015 | Penrod |
| 2015/0072323 A1 | 3/2015 | Postlethwaite |
| 2015/0125836 A1 | 5/2015 | Daniel |
| 2015/0194073 A1 | 7/2015 | Becker |
| 2015/0235565 A1 | 8/2015 | Postlethwaite |
| 2015/0248846 A1 | 9/2015 | Postlethwaite |
| 2016/0093233 A1 | 3/2016 | Boulware |
| 2016/0125763 A1 | 5/2016 | Becker |
| 2016/0203734 A1 | 7/2016 | Boulware |
| 2016/0203735 A1 | 7/2016 | Boulware |
| 2016/0260261 A1 | 9/2016 | Hsu |
| 2016/0331592 A1 | 11/2016 | Stewart |
| 2016/0343268 A1 | 11/2016 | Postlethwaite |
| 2017/0053557 A1 | 2/2017 | Daniel |

FOREIGN PATENT DOCUMENTS

| | | |
|---|---|---|
| CN | 201083660 Y | 7/2008 |
| CN | 201149744 | 11/2008 |
| CN | 101406978 | 4/2009 |
| CN | 101419755 A1 | 4/2009 |
| CN | 201229711 Y | 4/2009 |
| CN | 101571887 A | 11/2009 |
| CN | 101587659 A | 11/2009 |
| CN | 101661589 | 3/2010 |
| CN | 102053563 | 5/2011 |
| CN | 102202836 | 9/2011 |
| CN | 202053009 | 11/2011 |
| CN | 202684308 U | 1/2013 |
| CN | 203503228 | 3/2014 |
| CN | 103871279 A | 6/2014 |
| DE | 28 33 638 A1 | 2/1980 |
| DE | 30 46 634 A1 | 1/1984 |
| DE | 32 44 307 A1 | 5/1984 |
| DE | 35 22 581 A1 | 1/1987 |
| DE | 4037879 A1 | 6/1991 |
| DE | 196 15 069 A1 | 10/1997 |
| DE | 197 39 720 C1 | 10/1998 |
| DE | 19834205 A1 | 2/2000 |
| DE | 200 09 543 U1 | 8/2001 |
| DE | 10 2005 047 204 A1 | 4/2007 |
| DE | 102006048165 | 1/2008 |
| DE | 10 2010 038 902 A1 | 2/2012 |
| DE | 202012013151 U1 | 2/2015 |
| EP | 0008527 | 1/1982 |
| EP | 0 108 599 A1 | 5/1984 |
| EP | 0 127 299 | 12/1984 |
| EP | 0 145 891 A1 | 6/1985 |
| EP | 319623 B1 | 10/1990 |
| EP | 0852986 A1 | 7/1998 |
| EP | 1 527 852 A1 | 5/2005 |
| EP | 1905533 A2 | 4/2008 |
| ES | 2 274 736 A1 | 5/2007 |
| FR | 1456780 | 3/1965 |
| FR | 2 827 066 A1 | 1/2003 |
| FR | 2 926 660 A1 | 7/2009 |
| GB | 1 455 972 | 11/1976 |
| GB | 1 511 608 | 5/1978 |
| GB | 2 254 172 A | 9/1992 |
| GB | 2435838 A | 9/2007 |
| GB | 2 454 232 A | 5/2009 |
| JP | 2-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | H08221107 | 8/1996 |
| JP | 08-132274 | 5/1998 |
| JP | 2000-167666 A | 6/2000 |
| JP | 2000-237872 | 9/2000 |
| JP | 2001-071140 A | 3/2001 |
| JP | 2002278670 A | 9/2002 |
| JP | 2003-200372 A | 7/2003 |
| JP | 2003-326362 A | 11/2003 |
| JP | 2004025270 | 1/2004 |
| JP | 2006-006604 A | 1/2006 |
| JP | 2006175205 | 7/2006 |
| JP | 2006-281270 A | 10/2006 |
| JP | 2007-290025 A | 11/2007 |
| JP | 2009-500178 A | 1/2009 |
| JP | 2009160636 A | 7/2009 |
| JP | 2010231792 | 10/2010 |
| JP | 2012024867 A | 2/2012 |
| JP | 2012218058 A | 11/2012 |
| KR | 100876425 | 12/2008 |
| KR | 20090010693 | 1/2009 |
| KR | 1020090111556 A | 10/2009 |
| KR | 20110068544 | 6/2011 |
| RU | 527045 | 7/1995 |
| RU | 2317183 | 2/2008 |
| RU | 2008 108 601 C1 | 11/2009 |
| SU | 1038963 A1 | 8/1983 |
| WO | 98/45078 | 10/1998 |
| WO | 0112376 A1 | 2/2001 |
| WO | 01/43910 | 6/2001 |
| WO | 0158400 A1 | 8/2001 |
| WO | 2004029549 | 4/2004 |
| WO | 2005102230 A1 | 11/2005 |
| WO | 2005110658 | 11/2005 |
| WO | 2006034571 A1 | 4/2006 |
| WO | 2007009131 | 1/2007 |
| WO | 2007039278 | 4/2007 |
| WO | 2009120921 | 1/2009 |
| WO | 2009060231 A1 | 5/2009 |
| WO | 2010020867 | 8/2009 |
| WO | 2009149740 A1 | 12/2009 |
| WO | 2010000003 A2 | 1/2010 |
| WO | 2010020870 | 2/2010 |
| WO | 2010044982 | 4/2010 |
| WO | 2010091493 A1 | 8/2010 |
| WO | 2011017608 A1 | 2/2011 |
| WO | 2011041037 A1 | 4/2011 |
| WO | 2011045654 A1 | 4/2011 |
| WO | 2011058433 | 5/2011 |
| WO | 2011059502 | 5/2011 |
| WO | 2011060350 A1 | 5/2011 |
| WO | 2011067447 A1 | 6/2011 |
| WO | 2011097035 A2 | 8/2011 |
| WO | 2012016851 | 2/2012 |
| WO | 2012082105 A1 | 6/2012 |
| WO | 2012137060 A1 | 10/2012 |
| WO | 2012143327 A1 | 10/2012 |
| WO | 2013014202 A1 | 1/2013 |
| WO | 2013-025672 | 2/2013 |
| WO | 2013061518 | 5/2013 |
| WO | 2013114189 A1 | 8/2013 |
| WO | 2013119749 | 8/2013 |
| WO | 2013175079 A1 | 11/2013 |
| WO | 2013186413 | 12/2013 |
| WO | 2014007830 A1 | 1/2014 |
| WO | 2014019045 A1 | 2/2014 |
| WO | 2014020386 | 2/2014 |
| WO | 2014140720 | 9/2014 |
| WO | 2014184710 | 11/2014 |
| WO | 2016/137578 | 9/2016 |

OTHER PUBLICATIONS

International Search Report and Written Opinion from PCT/IB2009/006605 dated Feb. 12, 2010.

Robert Schoder, "Design and Implementation of a Video Sensor for Closed Loop Control of Back Bead Weld Puddle Width," Massa-

(56) References Cited

OTHER PUBLICATIONS chusetts, Institute of Technology, Dept. of Mechanical Engineering, May 27, 1983, 64 pages.
Hills and Steele, Jr.; "Data Parallel Algorithms", Communications of the ACM, Dec. 1986, vol. 29, No. 12, p. 1170.
Nancy C. Porter, J. Allan Cote, Timothy D. Gifford, and Wim Lam, Virtual Reality Welder Training, 29 pages, dated Jul. 14, 2006.
J.Y. (Yosh) Mantinband, Hillel Goldenberg, Llan Kleinberger, Paul Kleinberger, Autosteroscopic, field-sequential display with full freedom of movement or Let the display were the shutter-glasses, 3ality (Israel) Ltd., 8 pages, 2002.
Fronius, ARS Electronica Linz GMBH, High-speed video technology is applied to research on welding equipment, and the results are visualized in the CAVE, 2 pages, May 18, 1997.
D.K. Aidun and S.A. Martin, "Penetration in Spot GTA Welds during Centrifugation," Journal of Material Engineering and Performance vol. 7(5), 4 pages, Oct. 1998—597.
Arc+ simulator; httl://www.123arc.com/en/depliant_ang.pdf; 2 pages, 2000.
Glen Wade, "Human uses of ultrasound: ancient and modern", Ulrasonics vol. 38, 5 pages, dated 2000.
ASME Definitions, Consumables, Welding Positions, 4 pages, dated Mar. 19, 2001. See http://www.gowelding.com/asme4.htm.
M. Abbas, F. Waeckel, Code Aster (Software) EDF (France), 14 pages, Oct. 2001.
Achim Mahrle, Jurgen Schmidt, "The influence of fluid flow phenomena on the laser beam welding process"; International Journal of Heat and Fluid Flow 23, 10 pages, dated 2002.
The Lincoln Electric Company; CheckPoint Production Monitoring brochure; four (4) pages; http://www.lincolnelectric.com/assets/en_US/products/literature/s232.pdf; Publication S2.32; 4 pages, Issue Date Feb. 12.
International Search Report and Written Opinion from PCT/US10/60129 dated Feb. 10, 2011.
Desroches, X.; Code-Aster, Note of use for aclculations of welding; Instruction manual U2.03 booklet: Thermomechincal; Document: U2.03.05; 13 pages, Oct. 1, 2003.
Fast, K. et al., "Virtual Training for Welding", Mixed and Augmented Reality, 2004, ISMAR 2004, Third IEEE and SM International Symposium on Arlington, VA, 2 pages, Nov. 2-5, 2004.
Cooperative Research Program, Virtual Reality Welder Training, Summary Report SR 0512, 4 pages, Jul. 2005.
Porter, et al., Virtual Reality Training, Paper No. 2005-P19, 14 pages, 2005.
Eduwelding+, Weld Into the Future; Online Welding Seminar—A virtual training environment; 123arc.com; 4 pages, 2005.
Miller Electric Mfg Co.; MIG Welding System features weld monitoring software; NewsRoom 2010 (Dialog® File 992); © 2011 Dialog. 2010; http://www.dialogweb.com/cgi/dwclient?reg=133233430487; three (3) pages; printed Mar. 8, 2012.
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Abbas, M. et al. .; Code_Aster; Introduction to Code_Aster; User Manual; Booklet U1.0-: Introduction to Code_Aster; Document: U1.02.00; Version 7.4; 14 pages, Jul. 22, 2005.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, 8 pages, Apr. 1, 2006, pp. 294-300.
Nancy C. Porter, Edison Welding Institute; J. Allan Cote, General Dynamics Electric Boat; Timothy D. Gifford, VRSim; and WIM LAM, FCS Controls; Virtual Reality Welder Trainer, Session 5: Joining Technologies for Naval Applications, 16 pages, earliest date Jul. 14, 2006.
T Borzecki, G. Bruce, Y.S. Han, M. Heinemann, A. Imakita, L. Josefson, W. Nie, D. Olson, F. Roland, and Y. Takeda, 16th International Shop and Offshore Structures Congress: Aug. 20-25, 2006: Southhampton, UK, 49 pages, vol. 2 Specialist Committee V.3 Fabrication Technology Committee Mandate.
Ratnam and Khalid: "Automatic classification of weld defects using simulated data and an MLP neutral network." Insight vol. 49, No. 3; 6 pages, Mar. 2007.
Wang et al., Study on welder training by means of haptic guidance and virtual reality for arc welding, 2006 IEEE International Conference on Robotics and Biomimetics, ROBIO 2006 ISBN-10: 1424405718, 5 pages, p. 954-958.
CS Wave, The Virtual Welding Trainer, 6 pages, 2007.
Asciencetutor.com, A division of Advanced Science and Automation Corp., VWL (Virtual Welding Lab), 2 pages, 2007.
Eric Linholm, John Nickolls, Stuart Oberman, and John Montrym, "NVIDIA Testla: A Unifired Graphics and Computing Architecture", IEEE Computer Society, 17 pages, 2008.
NSRP ASE, Low-Cost Virtual Realtiy Welder Training System, 1 Page, 2008.
Edison Welding Institute, E-Weld Predictor, 3 pages, 2008.
CS Wave, A Virtual learning tool for welding motion, 10 pages, Mar. 14, 2008.
The Fabricator, Virtually Welding, Training in a virtual environment gives welding students a leg up, 4 pages, Mar. 2008.
N. A. Tech., P/NA.3 Process Modeling and Optimization, 11 pages, Jun. 4, 2008.
FH Joanneum, Fronius—virtual welding, 2 pages, May 12, 2008.
Eduwelding+, Training Activities with arc+ simulator; Weld Into the Future, Online Welding Simulator—A virtual training environment; 123arc.com; 6 pages, May 2008.
ChemWeb.com, Journal of Materials Engineering and Performance (v.7, #5), 3 pgs., printed Sep. 26, 2012.
Choquet, Claude; "ARC+: Today's Virtual Reality Solution for Welders" Internet Page, 6 pages, Jan. 1, 2008.
Juan Vicenete Rosell Gonzales, "RV-Sold: simulator virtual para la formacion de soldadores"; Deformacion Metalica, Es. vol. 34, No. 301, 14 pages, Jan. 1, 2008.
White et al., Virtual welder training, 2009 IEEE Virtual Reality Conference, 1 page, p. 303, 2009.
Training in a virtual environment gives welding students a leg up, retrieved on Apr. 12, 2010 from: http://www.thefabricator.com/article/arcwelding/virtually-welding, 4 pages.
Sim Welder, Train better welders faster, retrieved on Apr. 12, 2010 from: http://www.simwelder.com.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; 2009; 18 pages; Sensors 2009, 9, 7753-7770; doi; 10.3390/s91007753.
Production Monitoring 2 brochure, four (4) pages, The Lincoln Electric Company, May 2009.
International Search Report and Written Opinion from PCT/IB10/02913 dated Apr. 19, 2011.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
J. Hu and Hi Tsai, Heat and mass transfer in gas metal arc welding. Part 1: the arc, found in ScienceDirect, International Journal of Heat and Mass Transfer 50 (2007), 14 pages, 833-846, available online on Oct. 24, 2006 http://www.web.mst.edu/~tsai/publications/HU-IJHMT-2007-1-60.pdf.
M. Ian Graham, Texture Mapping, Carnegie Mellon University Class 15-462 Computer Graphics, Lecture 10, 53 pages, dated Feb. 13, 2003.
Notice of Allowance from U.S. Appl. No. 15/077,532 dated Mar. 28, 2018.
Andreas Grahn, "Interactive Simulation of Contrast Fluid using Smoothed Particle Hydrodynamics," Jan. 1, 2008, Masters Thesis in Computing Science, Umea University, Department of Computing Science, Umea Sweden; 69 pages.
Marcus Vesterlund, Simulation and Rendering of a Viscous Fluid using Smoothed Particle Hydrodynamics, Dec. 3, 2004, Master's

(56) References Cited

OTHER PUBLICATIONS

Thesis in Computing Science, Umea University, Department of Computing Science, Umea Sweden; 46 pages.
M. Muller,, et al., Point Based Animation of Elastic, Plastic and Melting Objects, Eurographics/ACM SIGGRAPH Symposium on Computer Animation (2004); 11 pages.
Andrew Nealen, "Point-Based Animation of Elastic, Plastic, and Melting Objects," CG topics, Feb. 2005; 2 pages.
D. Tonnesen, Modeling Liquids and Solids using Thermal Particles, Proceedings of Graphics Interface'91, pp. 255-262, Calgary, Alberta, 1991.
CUDA Programming Guide Version 1.1, Nov. 29, 2007, 143 pages.
Websters II new college dictionary, 3rd ed., Houghton Mifflin Co., copyright 2005, Boston, MA, p. 1271, definition of Wake, 3 pages.
Da Dalto L, et al. "CS Wave: Learning welding motion in a virtual environment" Published in Proceedings of the IIW International Conference, Jul. 10-11, 2008; 19 pages.
CS Wave-Manual, "Virtual Welding Workbench User Manual 3.0" 2007; 25 pages.
Choquet, Claude. ARC+®: Today's Virtual Reality Solution for Welders, Published in Proceedings of the IIW International Conference; Jul. 10-11, 2008; 19 pages.
Welding Handbook, Welding Science & Technology, American Welding Society, Ninth Ed., Copyright 2001. Appendix A "Terms and Definitions" 54 pages.
Virtual Welding: A Low Cost Virtual Reality Welder Training System, NSRP RA 07-01—BRP Oral Review Meeting in Charleston, SC at ATI, Mar. 2008; 6 pages.
Dorin Aiteanu, "Virtual and Augmented Reality Supervisor for a New Welding Helmet Dissertation," Nov. 15, 2005; 154 pages.
Screen Shot of CS Wave Exercise 135.FWPG Root Pass Level 1 https://web.archive.org/web/20081128081858/http:/wave.c-s.fr/images/english/snap_evolution2.Jpg; 1 page.
Screen Shot of CS Wave Control Centre V3.0.0 https://web.archive.org/web/20081128081915/http:/wave.c-s.fr/ images/english/snap_evolution4.jpg; 1 page.
Screen Shot of CS Wave Control Centre V3.0.0 https://web.archive.org/web/20081128081817/http:/wave.c-s.fr/images/english/snap_evolution6.jpg; 1 page.
Da Dalto L, et al. "CS Wave a Virtual learning tool for the welding motion," Mar. 14, 2008; 10 pages.
Nordruch, Stefan, et al. "Visual Online Monitoring of PGMAW Without a Lighting Unit", Jan. 2005; 14 pages.
The Evolution of Computer Graphics; Tony Tamasi, NVIDIA, 2008; 36 pages.
VRSim Powering Virtual Reality, www.lincolnelectric.com/en-us/eguipment/Iraining-eguipment/Pages/powered-by-'rsim.aspx, 2016, 1 page.
Hillers, B.; Graser, A. "Direct welding arc observation without harsh flicker," 8 pages, allegedly FABTECH International and AWS welding show, 2007.
Declaration of Dr. Michael Zyda, May 3, 2016, exhibit to IPR 2016-00905; 72 pages.
Declaration of Edward Bohnart, Apr. 27, 2016, exhibit to IPR 2016-00905; 23 pages.
Declaration of Dr. Michael Zyda, May 3, 2016, exhibit to IPR 2016-00904; 76 pages.
Declaration of Edward Bohnart, Apr. 27, 2016, exhibit to IPR 2016-00904; 22 pages.
Declaration of Axel Graeser, Apr. 17, 2016, exhibit to IPR 2016-00840; 88 pages.
International Search Report and Written Opinion from PCT/IB2014/002346 dated Feb. 24, 2015.
ARC+—Archived Press Release from WayBack Machine from Jan. 31, 2008-Apr. 22, 2013, Page, https://web.βrchive.org/web/20121006041803/http://www.123certification.com/en/article_press/index.htm, Jan. 21, 2016, 3 pages.
P. Tschirner et al., "Virtual and Augmented Reality for Quality Improvement of Manual Welds" National Institute of Standards and Technology, Jan. 2002, Publication 973, 24 pages.
Y. Wang et al., "Impingement of Filler Droplets and Weld Pool During Gas Metal Arc Welding Process" International Journal of Heat and Mass Transfer, Sep. 1999, 14 pages.
Larry Jeffus, "Welding Principles and Applications," Sixth Edition, 2008, 10 pages.
R.J. Renwick et al., "Experimental Investigation of GTA Weld Pool Oscillations," Welding Research—Supplement to the Welding Journal, Feb. 1983, 7 pages.
Matt Phar, "GPU Gems 2 Programming Techniques for High-Performance Graphics and General-Purpose Computation," 2005, 12 pages.
International Search Report and Written Opinion from PCT/IB2015/000161 dated Jun. 8, 2015.
International Search Report and Written Opinion from PCT/IB2015/000257 dated Jul. 3, 2015.
International Search Report and Written Opinion from PCT/IB2015/000777 dated Sep. 21, 2015.
International Search Report and Written Opinion from PCT/IB2015/000814 dated Nov. 5, 2015.
International Search Report and Written Opinion from PCT/IB2015/001711 dated Jan. 4, 2016.
International Preliminary Report on Patentability from PCT/IB2014/001796 dated Mar. 15, 2016.
International Preliminary Report on Patentability from PCT/IB2015/000161 dated Aug. 25, 2016.
International Preliminary Report on Patentability from PCT/IB2015/000257 dated Sep. 15, 2016.
International Search Report and Written Opinion from PCT/IB2015/000777 dated Dec. 15, 2016.
International Search Report and Written Opinion from PCT/IB2015/000814 dated Dec. 15, 2016.
International Preliminary Report on Patentability from PCT/IB2015/001084 dated Jan. 26, 2017.
Extended European Search Report from EP Application No. 10860823.3 dated Jun. 6, 2017.
Communication Pursuant to Article 94(3) EPC in EP Application No. 13753204.0 dated Mar. 9, 2017.
Office action from U.S. Appl. No. 12/499,687 dated Oct. 16, 2012.
Office action from U.S. Appl. No. 12/499,687 dated Jun. 26, 2013.
Notice of Allowance from U.S. Appl. No. 12/966,570 dated Apr. 29, 2014.
Corrected Notice of Allowance from U.S. Appl. No. 12/966,570 dated Feb. 23, 2015.
Communication pursuant to Article 94(3) EPC from EP Application No. 15732934.3 dated Apr. 24, 2018.
Communication pursuant to Article 94(3) EPC from EP Application No. 15731664.7 dated Jul. 13, 2018.
Bargteil et al., "A Semi-Lagrangian Contouring Method for Fluid Simulation," ACM Transactions on Graphics, vol. 25, No. 1, Jan. 2006, pp. 19-38.
Chentanez et al., "Liquid Simulation on Lattice-Based Tetrahedral Meshes," Eurographics/ACM SIGGRAPH Symposium on Computer Animation (2007), 10 pages.
Chentanez et al., "Simultaneous Coupling of Fluids and Deformable Bodies," Eurographics/ ACM SIGGRAPH Symposium on Computer Animation, 2006, pp. 83-89.
Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.
Feldman et al., "Animating Suspended Particle Explosions," Computer Graphics Proceedings, Annual Conference Series, Jul. 27-31, 2003, pp. 1-8.
Feldman et al., "Fluids in Deforming Meshes," Eurographics/ACM SIGGRAPH Symposium on Computer Animation (2005), pp. 255-259.
Foster et al., "Practical Animation of Liquids," ACM SIGGRAPH, Aug. 12-17, 2001, Los Angeles, CA, pp. 23-30.
Foster et al., "Realistic Animation of Liquids," Graphical Models and Image Processing, vol. 58, No. 5, Sep. 1996, pp. 471-483.
Goktekin et al., "A Method for Animating Viscoelastic Fluids," Computer Graphics Proceedings, Annual Conference Series, Aug. 8-12, 2004, pp. 1-6.

(56) References Cited

OTHER PUBLICATIONS

Holmberg et al., "Efficient Modeling and Rendering of Turbulent Water over Natural Terrain," Proceedings of the 2nd international conference on Computer graphics and interactive techniques in Australasia and South East Asia, Singapore, Jun. 15-18, 2004, pp. 15-22.
Irving et al., "Efficient Simulation of Large Bodies of Water by Coupling Two and ThreeDimensional Techniques," ACM Transactions on Graphics (TOG), vol. 25, Issue 3, Jul. 2006,pp. 805-811.
Kass et al., "Rapid, Stable Fluid Dynamics for Computer Graphics," Computer Graphics, vol. 24, No. 4, Aug. 1990, pp. 49-57.
Klinger et al., "Fluid Animation with Dynamic Meshes," Computer Graphics Proceedings, Annual Conference Series, Jul. 30-Aug. 3, 2006, 820-825.
Muller et al., "Particle-Based Fluid Simulation for Interactive Applications," Eurographics/SIGGRAPH Symposium on Computer Animation (2003), pp. 154-159 and 372.
O'Brien et al., "Dynamic Simulation of Splashing Fluids," Proceedings of Computer Animation '95, Apr. 19-21, 1995, in Geneva, Switzerland, pp. 198-205.
Premoze et al., "Particle-Based Simulation of Fluids," Eurographics, vol. 22, No. 3 (2003), 10 pages.
Rasmussen et al., "Directable Photorealistic Liquids," Eurographics/ ACM SIGGRAPH Symposium on Computer Animation (2004), pp. 193-202.
Stam, "Stable Fluids," SIGGRAPH 99 Conference Proceedings, Annual Conference Series, Aug. 1999, 121-128.
Thurey et al., "Real-time Breaking Waves for Shallow Water Simulations," Proceedings of the Pacific Conference on Computer Graphics and Applications, Maui, Hawaii, Oct. 29-Nov. 2, 2007, 8 pages.
Yaoming, "Applications of Microcomputer in Robot Technology," Scientific and Technical Documentation Press, Sep. 1987, pp. 360-365.
Office Action from U.S. Appl. No. 14/827,657 dated May 26, 2017.
Office Action from U.S. Appl. No. 14/827,657 dated Jan. 16, 2018.
Office Action from U.S. Appl. No. 15/228,524 dated Feb. 5, 2018.
Office Action from Chinese Application No. 201280075678.5 dated Jul. 5, 2016.
Office Action from Chinese Application No. 201480027306.4 dated Aug. 3, 2016.
Office Action from Chinese Application No. 201380017661.9 dated Aug. 22, 2016.
Office Action from Chinese Application No. 201480025359.2 dated Sep. 26, 2016.
Office Action from Chinese Application No. 201480025614.3 dated Nov. 28, 2016.
Office Action from Chinese Application No. 201480025359.2 dated Feb. 28, 2017.
Office Action from Chinese Application No. 201380076368.X dated Mar. 1, 2017.
Office Action from Chinese Application No. 201480025614.3 dated Jun. 9, 2017.
Office Action in CN Application No. 201480012861.X dated Jul. 18, 2017.
Office Action in CN Application No. 201610179195.X dated Jul. 19, 2017.
Office Action in CN Application No. 201480025985.1 dated Aug. 10, 2017.
Decision on Rejection in CN Application No. 201380047141.2 dated Sep. 7, 2017.
Office Action from U.S. Appl. No. 14/829,161 dated Jul. 28, 2017.
Notification of Reason for Refusal from KR Application No. 10-2015-7002697 dated Sep. 25, 2017.
Communication Pursuant to Article 94(3) EPC in EP Application No. 14732357.0 dated Feb. 12, 2018.
Office Action in JP Application No. 2015-562352 dated Feb. 6, 2018.
Office Action in JP Application No. 2015-562353 dated Feb. 6, 2018.
Office Action in JP Application No. 2015-562354 dated Feb. 6, 2018.
Office Action in JP Application No. 2015-562355 dated Feb. 6, 2018.
Office Action in CN Application No. 201710087175.4 dated Feb. 1, 2018.
Bargteil et al., "A Texture Synthesis Method for Liquid Animations," Eurographics/ ACM SIGGRAPH Symposium on Computer Animation, 2006, pp. 345-351.
Aidun, Daryush K "Influence of simulated high-g on the weld size of Al-Li-Alloy" Acta Astronautica, vol. 48, No. 2-3, pp. 153-156, 2001.
Boss (engineering), Wikipedia, 1 page, printed Feb. 6, 2014.
CS Wave, Product Description, 2 pages, printed Jan. 14, 2015.
EnergynTech Inc.; website printout; http://www.energyntech.com./; Advanced Metals Processing Technology & Flexible Automation for Manufacturing; Virtual Welder; Virtual training system for beginning welders; 2 page; 2014.
EnergynTech Inc.; website printout; http://www.energyntech.com/ Zipper.html; Zipper Robot Performing a HiDep Weld; 1 page 2014.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
Fillet weld, Wikipedia, 3 pgs, printed Feb. 6, 2014.
Fronius, Virtual Welding, 8 pages, printed Jan. 14, 2015.
Fronius, Virtual Welding, The Welder Training of the Future, 8 page brochure, 2011.
The Goodheart-Wilcox Co., Inc., Weld Joints and Weld Types, Chaper 6; pp. 57-68; date unknown.
Kemppi ProTrainer, product data, 3 pages, printed Jan. 14, 2015.
Leap Motion, Inc., product information, copyright 2013, 14 pages.
Learning Labs, Inc., Seabery, Soldamatic Augmented Reality Welding Trainers, 4 pgs., printed Mar. 20, 2014.
Lim et al., "Automatic classification of weld defects using simulated data and MLP neural network", Insight, vol. 49, No. 3, Mar. 2007.
Narayan et al., "Computer Aided Design and Manufacturing," pp. 3-4, 14-15, 17-18, 92-95, and 99-100, Dec. 31, 2008.
NSRP—Virtual Welding—A Low Cost Virtual Reality Welder Training System—Phase II—Final Report; Feb. 29, 2012; Kenneth Fast, Jerry Jones, Valerie Rhoades; 53 pages.
Seabury Soluciones, Soldamatic Welding Trainer Simulator, 30 pages, printed Jan. 14, 2015.
Terebes; Institute of Automation; University of Bremen; Project Motivation Problems Using Traditional Welding Masks; 2 page ; 2015.
Weld nut, Wikipedia, 2 pgs, printed Feb. 6, 2014.
Weldplus, Welding Simulator, 2 pages, printed Jan. 14, 2015.
WeldWatch Software/Visible Welding; website printout; http:// visiblewelding.com/weldwatch-software/; 4 pages; 2015.
Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACMInternational Symposium on Mixed and Augmented Reality; 2003; 2 pages.
Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.
Adams et., "Adaptively Sampled Particle Fluids," ACM Transactions on Graphics, vol. 26, No. 3, Article 48, Jul. 2007, pp. 48.1-48.7.
Chuansong Wu: "Microcomputer-based welder training simulator", Computers in Industry, vol. 20, No. 3, Oct. 1992, 5 pages, pp. 321-325, XP000205597, Elsevier Science Publishers, Amsterdam, NL.
ViziTech USA, retrieved on Mar. 27, 2014 from http://vizitechusa. com/, 2 pages.
Guu and Rokhlin ,Technique for Simultaneous Real-Time Measurements of Weld Pool Surface Geometry and Arc Force, 10 pages, Dec. 1992.
William T. Reeves, "Particles Systems—A Technique for Modeling a Class of Fuzzy Objects", Computer Graphics 17:3 pp. 359-376, 1983, 17 pages.

(56) References Cited

OTHER PUBLICATIONS

S.B. Chen, L. Wu, Q. L. Wang and Y. C. Liu, Self-Learning Fuzzy Neural Networks and Computer Vision for Control of Pulsed GTAW, 9 pages, dated May 1997.
Patrick Rodjito, Position tracking and motion prediction using Fuzzy Logic, 81 pages, 2006, Colby College.
O'Huart, Deat, and Lium; Virtual Environment for Training, 6th International Conference, ITS 20002, 6 pages, Jun. 2002.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
M. Jonsson, L Karlsson, and L-E Lindgren, Simulation of Tack Welding Procedures in Butt Joint Welding of Plates Welding Research Supplement, Oct. 1985, 7 pages.
Isaac Brana Veiga, Simulation of a Work Cell in the IGRIP Program, dated 2006, 50 pages.
Balijepalli, A. and Kesavadas, Haptic Interfaces for Virtual Environment and Teleoperator Systems, Haptics 2003, Department of Mechanical & Aerospace Engineering, State University of New York at Buffalo, NY.
Johannes Hirche, Alexander Ehlert, Stefan Guthe, Michael Doggett, Hardware Accelerated Per-Pixel Displacement Mapping, 8 pages.
Yao et al., 'Development of a Robot System for Pipe Welding'. 2010 International Conference on Measuring technology and Mechatronics Automation. Retrieved from the Internet: http://ieeexplore.ieee.org/stamp/stamp.jsp?tp=&arnumber=5460347&tag=1; pp. 1109-1112, 4 pages.
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE), pp. 1-6, 6 pages, Apr. 29, 2012.
Kyt Dotson, Augmented Reality Welding Helmet Prototypes How Awsome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.
Terrence O'Brien, "Google's Project Glass gets some more details",Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
G. Wang, P.G. Huang, and Y.M. Zhang: "Numerical Analysis of Metal Transfer in Gas Metal Arc Welding": Departments of Mechanical Engineering; and Electrical and Computer Engineering, University of Kentucky, Lexington, KY 40506-0108, 10 pages, Dec. 10, 2001.
Echtler et al, "17 The Intelligent Welding Gun: Augmented Reality for Experimental Vehicle Construction," Virtual and Augmented Reality Applications in Manufacturing (2003) pp. 1-27.
Teeravarunyou et al, "Computer Based Welding Training System," International Journal of Industrial Engineering (2009) 16(2): 116-125.
Antonelli et al, "A Semi-Automated Welding Station Exploiting Human-Robot Interaction," Advanced Manufacturing Systems and Technology (2011) pp. 249-260.
Praxair Technology Inc, "The RealWeld Trainer System: Real Weld Training Under Real Conditions" Brochure (2013) 2 pages.
Xie et al., "A Real-Time Welding Training System Base on Virtual Reality," Wuhan Onew Technology Co., Lid, IEEE Virtual Reality Conference 2015, Mar. 23-27, Arles France, p. 309-310.
Lincoln Global, Inc., "VRTEX 360: Virtual Reality Arc Welding Trainer" Brochure (2015) 4 pages.
Wuhan Onew Technology Co Ltd, "ONEW-360 Welding Training Simulator" http://en.onewtech.com/_d276479751.htm as accessed on Jul. 10, 2015, 14 pages.
The Lincoln Electric Company, "VRTEX Virtual Reality Arc Welding Trainer," http://www.lincolnelectric.com/en-us/equipment/training-equipment/Pages/vrtex.aspx as accessed on Jul. 10, 2015, 3 pages.
Miller Electric Mfg Co, "LiveArc: Welding Performance Management System" Owner's Manual, (Jul. 2014) 64 pages.
Miller Electric Mfg Co, "LiveArc Welding Performance Management System" Brochure, (Dec. 2014) 4 pages.
Office action from U.S. Appl. No. 12/499,687 dated Mar. 6, 2014.
Office action from U.S. Appl. No. 12/499,687 dated Nov. 6, 2014.
Office action from U.S. Appl. No. 12/966,570 dated May 8, 2013.
Office action from U.S. Appl. No. 13/543,240 dated Nov. 14, 2014.
Office action from U.S. Appl. No. 14/444,173 dated Mar. 18, 2015.
Notice of Allowance from U.S. Appl. No. 13/543,240 dated Jun. 3, 2015.
Notice of Allowance from U.S. Appl. No. 14/444,173 dated Jun. 24, 2015.
Office action from U.S. Appl. No. 15/077,481 dated May 23, 2016.
Notice of Allowance from U.S. Appl. No. 15/077,481 dated Aug. 10, 2016.
Notice of Allowance from U.S. Appl. No. 15/077,481 dated Feb. 3, 2017.
Office Action from U.S. Appl. No. 14/190,812 dated Nov. 9, 2016.
Office Action from U.S. Appl. No. 14/190,812 dated Feb. 23, 2017.
Office Action from U.S. Appl. No. 15/077,532 dated Dec. 29, 2017.
Office Action from U.S. Appl. No. 14/293,700 dated Dec. 28, 2016.
Notice of Allowance from U.S. Appl. No. 14/293,700 dated May 10, 2017.
Office Action from U.S. Appl. No. 14/293,826 dated Dec. 30, 2016.
Office Action from U.S. Appl. No. 14/293,826 dated Jul. 21, 2017.
Office Action from U.S. Appl. No. 14/526,914 dated Feb. 3, 2017.
Office Action from U.S. Appl. No. 14/526,914 dated Jun. 6, 2017.
Office Action from U.S. Appl. No. 14/552,739 dated Feb. 17, 2017.
Office Action from U.S. Appl. No. 14/615,637 dated Apr. 27, 2017.
Russell and Norvig, "Artificial Intelligence: A Modern Approach", Prentice-Hall (Copyright 1995).
Mechanisms and Mechanical Devices Source Book, Chironis, Neil Sclater, McGraw Hill; 2nd Addition, 1996.
International Search Report and Written Opinion from PCT/US12/45776 dated Oct. 1, 2012.
Bender Shipbuilding and Repair Co. Virtual Welding—A Low Cost Virtual Reality Welding Training System. Proposal submitted pursuant to MSRP Advanced Shipbuilding Enterprise Research Announcement, Jan. 23, 2008. 28 pages, See also, http://www.nsrp.org/6-PresentationsM/D/020409 Virtual Welding Wilbur.pdf.
Aiteanu, Dorian; and Graser, Axel. "Generation and Rendering of a Virtual Welding Seam in an Augmented Reality Training Environment." Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.
Tschirner, Petra; Hillers, Bernd; and Graser, Axel "A Concept for the Application of Augmented Reality in Manual Gas Metal Arc Welding." Proceedings of the International Symposium on Mixed and Augmented Reality; 2 pages; 2002.
Penrod, Matt. "New Welder Training Tools." EWI PowerPoint presentation; 16 pages; allegedly 2008.
Fite-Georgel, Pierre. Is there a Reality in Industrial Augmented Reality?10th IEEE International Symposium on Mixed and Augmented Reality (ISMAR). 10 pages, allegedly 2011.
Hillers, B.; Graser, A. "Real time Arc-Welding Video Observation System." 62nd International Conference of IIW, Jul. 12-17, 2009, 5 pages, allegedly Singapore 2009.
Advance Program of American Welding Society Programs and Events. Nov. 11-14, 2007. 31 pages. Chicago.
Terebes: examples from http://www.terebes.uni-bremen.de.; 6 pages.
Sandor, Christian; Gudrun Klinker. "PAARTI: Development of an Intelligent Welding Gun for BMW." PIA2003, 7 pages, Tokyo. 2003.

(56) References Cited

OTHER PUBLICATIONS

ARVIKA Forum Vorstellung Projekt PAARI. BMW Group Virtual Reality Center. 4 pages. Nuermberg. 2003.
Sandor, Christian; Klinker, Gudrun. "Lessons Learned in Designing Ubiquitous Augmented Reality User Interfaces." 21 gages, allegedly from Emerging Technologies of Augmented Reality: Interfaces Eds. Haller, M.; Billinghurst, M.; Thomas, B. Idea Group Inc. 2006.
Impact Welding: examples from current and archived website, trade shows, etc. See, e.g., http://www.impactwelding.com. 53 pages.
http://www.nsrp.org/6-Presentations/WDVirtual_Welder.pdf (Virtual Reality Welder Training, Project No. SI051, Navy ManTech Program, Project Review for ShipTech 2005); 22 pages. Biloxi, MS.
https://app.aws_org/w/r/www/wj/2005/031WJ_2005_03.pdf (AWS Welding Journal, Mar. 2005 (see, e.g., p. 54)).; 114 pages.
https://app.aws.org/conferences/defense/live index.html (AWS Welding in the Defense Industry conference schedule, 2004); 12 pages.
https://app.aws.org/wj/2004/04/052/njc (AWS Virtual Reality Program to Train Welders for Shipbuilding, workshop information, 2004); 7 pages.
https://app.aws.org/wj/2007/11WJ200711.pdf (AWS Welding Journal, Nov. 2007); 240 pages.
American Welding Society, "Vision for Welding Industry;" 41 pages.
Energetics, Inc. "Welding Technology Roadmap," Sep. 2000, 38 pages.
Aiteanu, Dorian; and Graser, Axel. Computer-Aided Manual Welding Using an Augmented Reality Supervisor Sheet Metal Welding Conference XII, Livonia, MI, May 9-12, 2006, 14 pages.
Hillers, Bernd; Aiteanu, Dorin and Graser, Axel "Augmented Reality—Helmet for the Manual Welding Process," Institute of Automation, University of Bremen, Germany; 21 pages.
ArcSentry Weld Quality Monitoring System; Native American Technologies, allegedly 2002, 5 pages.
P/NA.3 Process Modelling and Optimization; Native American Technologies, allegedly 2002, 5 pages.
B. Hillers, D. Aitenau, P. Tschirner, M. Park, A. Graser, B. Balazs, L Schmidt, "TEREBES: Welding Helmet with AR Capabilities", Institute of Automatic University Bremen; Institute of Industrial Engineering and Ergonomics, 10 pages, allegedly 2004.
Sheet Metal Welding Conference Xlr, American Welding Society Detroit Section, May 2006, 11 pages.
Kenneth Fast, Timothy Gifford, Robert Yancey, "Virtual Training for Welding", Proceedings of the Third IEEE and ACM International Symposium on Mixed and Augmented Reality (ISMAR 2004); 2 pages.
Amended Answer to Complaint with Exhibit A for Patent Infringement filed by Seabery North America Inc. in *Lincoln Electric Co. et al.* v. *Seabery Soluciones, S.L. et al.*, Case No. 1:15-cv-01575-DCN, filed Mar. 1, 2016, in the U.S. District Court for the Northern District of Ohio; 19 pages.
Amended Answer to Complaint with Exhibit A for Patent Infringement filed by Seabery Soluciones SL in *Lincoln Electric Co. et al.* v. *Seabery Soluciones, S.L_ et al.*, Case No. 1:15-cv-01575-DCN, filed Mar. 1, 2016 in the U.S. District Court for the Northern District of Ohio; 19 pages.

Reply to Amended Answer to Complaint for Patent Infringement filed by Lincoln Electric Company; Lincoln Global, Inc. in *Lincoln Electric Co. et al.* v. *Seabery Soluciones, S.L. et al.*, Case No. 1:15-cv-01575-DCN; filed Mar. 22, 2016; 5 pages.
Answer for Patent Infringement filed by Lincoln Electric Company, Lincoln Global, Inc. in *Lincoln Electric Co. et al.* v. *Seabery Soluciones, S.L. et al.*, Case No. 1:15-cv-01575-DCN; filed Mar. 22, 2016; 5 pages.
Petition for Inter Partes Review of U.S. Pat. No. 8,747,116; IPR 2016-00749; Apr. 7, 2016; 70 pages.
Petition for Inter Partes Review of U.S. Pat. No. RE45,398; IPR 2016-00840; Apr. 18, 2016; 71 pages.
Petition for Inter Partes Review of U.S. Pat. No. 9,293,056; IPR 2016-00904; May 9, 2016; 91 pages.
Petition for Inter Partes Review of U.S. Pat. No. 9,293,057; IPR 2016-00905; May 9, 2016; 87 pages.
http://www.vrsim.net/history, downloaded Feb. 26, 2016.
Complaint for Patent Infringement in *Lincoln Electric Co. et al.* v. *Seabery Soluciones, S.L. et al.*, Case No. 1:15-av-01575-DCN, filed Aug. 10, 2015, in the U.S. District Court for the Northern District of Ohio; 81 pages.
Kobayashi, Ishigame, and Kato, Simulator of Manual Metal Arc Welding with Haptic Display ("Kobayashi 2001"), Proc. of the 11th International Conf. on Artificial Reality and Telexistence (ICAT), Dec. 5-7, 2001, pp. 175-178, Tokyo, Japan.
Wahi, Maxwell, and Reaugh, "Finite-Difference Simulation of a Multi-Pass Pipe Weld" ("Wahi"), vol. L, paper 3/1, International Conference on Structural Mechanics in Reactor Technology, San Francisco, CA, Aug. 15-19, 1977.
Declaration of Dr. Michael Zyda, May 3, 2016, exhibit to IPR 2016-00749.
Declaration of Edward Bohnert, Apr. 27, 2016, exhibit to IPR 2016-00749.
Swantec corporate web page downloaded Apr. 19, 2016. httpl/www.swantec.com/technology/numerical-simulation/.
Catalina, Stefanescu, Sen, and Kaukler, Interaction of Porosity with a Planar Solid/Liquid Interface (Catalina),), Metallurgical and Materials Transactions, vol. 35A, May 2004, pp. 1525-1538.
Fletcher Yoder Opinion re RE45398 and 14/589,317; including appendices; Sep. 9, 2015; 1700 pages.
Kobayashi, Ishigame, and Kato, "Skill Training System of Manual Arc Welding by Means of Face-Shield-Like HMD Virtual Electrode" ("Kobayashi 2003"), Entertainment Computing, vol. 112 of the International Federation for Information Processing (IFIP), Springer Science + Business Media, New York, copyright 2003, pp. 389-396.
G.E. Moore, No exponential is forever: but 'Forever can be delayed!: IEEE International Solid-State Circuits Conference, 2003. 19 pages.
"High Performance Computer Architectures_ A Historical Perspective," downloaded May 5, 2016. http://homepages.inf.ed.ac.uk/cgi/mi/comparch. pl?Paru/perf.html,Paru/perf-f.html,Paru/menu-76.html; 3 pages.
Office Action from Chinese Application No. 201580050408.2 dated Nov. 28, 2018.
Office Action from JP Application No. 2017-515935 dated Apr. 23, 2019.

* cited by examiner

SYSTEM FOR CHARACTERIZING MANUAL WELDING OPERATIONS ON PIPE AND OTHER CURVED STRUCTURES

CROSS-REFERENCE TO RELATED APPLICATIONS

This application is a continuation of U.S. application Ser. No. 14/827,657 filed on Aug. 17, 2015, which claims priority under 35 U.S.C. § 119(e) from, and any other benefit of, U.S. Provisional Patent Application No. 62/055,724 filed on Sep. 26, 2014, the entire disclosures of each of which are herein incorporated by reference.

The following commonly-assigned U.S. patent application is also incorporated by reference herein in its entirety: U.S. Non-Provisional patent application Ser. No. 13/543,240, filed on Jul. 6, 2012 and entitled "System for Characterizing Manual Welding Operations," now U.S. Pat. No. 9,221,117.

FIELD

The general inventive concepts relate, among other things, to methods, apparatus, systems, programs, and techniques for remotely controlling operation of a welding device.

BACKGROUND

The described invention relates in general to a system for characterizing manual welding operations, and more specifically to a system for providing useful information to a welding trainee by capturing, processing, and presenting in a viewable format, data generated by the welding trainee in manually executing an actual weld in real time.

The manufacturing industry's desire for efficient and economical welder training has been a well-documented topic over the past decade as the realization of a severe shortage of skilled welders is becoming alarmingly evident in today's factories, shipyards, and construction sites. A rapidly retiring workforce, combined with the slow pace of traditional instructor-based welder training has been the impetus for the development of more effective training technologies. Innovations which allow for the accelerated training of the manual dexterity skills specific to welding, along with the expeditious indoctrination of arc welding fundamentals are becoming a necessity. The characterization and training system disclosed herein addresses this vital need for improved welder training and enables the monitoring of manual welding processes to ensure the processes are within permissible limits necessary to meet industry-wide quality requirements. To date, the majority of welding processes are performed manually, yet the field is lacking practical commercially available tools to track the performance of these manual processes. Thus, there is an ongoing need for an effective system for training welders to properly execute various types of welds under various conditions.

SUMMARY

The following provides a summary of certain exemplary embodiments of the present invention. This summary is not an extensive overview and is not intended to identify key or critical aspects or elements of the present invention or to delineate its scope.

In accordance with one aspect of the present invention, a system for characterizing manual and/or semiautomatic welding operations and exercises is provided. This system includes a data generating component; a data capturing component; and a data processing component. The data generating component further includes a fixture, wherein the geometric characteristics of the fixture are predetermined; a workpiece adapted to be mounted on the fixture, wherein the workpiece includes at least one joint to be welded, and wherein the vector extending along the joint to be welded defines an operation path, wherein the operation path is linear, curvilinear, circular, or a combination thereof; at least one calibration device, wherein each calibration device further includes at least two point markers integral therewith, and wherein the geometric relationship between the point markers and the operation path is predetermined; and a welding tool, wherein the welding tool is operative to form a weld at the joint to be welded, wherein the welding tool defines a tool point and a tool vector, and wherein the welding tool further includes a target attached to the welding tool, wherein the target further includes a plurality of point markers mounted thereon in a predetermined pattern, and wherein the predetermined pattern of point markers is operative to define a rigid body. The data capturing component further includes an imaging system for capturing images of the point markers. The data processing component is operative to receive information from the data capturing component and then calculate the position and orientation of the operation path relative to the three-dimensional space viewable by the imaging system; the position of the tool point and orientation of the tool vector relative to the rigid body; and the position of the tool point and orientation of the tool vector relative to the operation path.

In accordance with another aspect of the present invention, a system for characterizing manual and/or semiautomatic welding operations and exercises is also provided. This system includes a data generating component; a data capturing component; and a data processing component. The data generating component further includes a fixture, wherein the geometric characteristics of the fixture are predetermined; a workpiece adapted to be mounted on the fixture, wherein the workpiece includes at least one joint to be welded, and wherein the vector extending along the joint to be welded defines an operation path, wherein the operation path is linear, curvilinear, circular, or a combination thereof; at least one calibration device, wherein each calibration device further includes at least two point markers integral therewith, and wherein the geometric relationship between the point markers and the operation path is predetermined; and a welding tool, wherein the welding tool is operative to form a weld at the joint to be welded, wherein the welding tool defines a tool point and a tool vector, and wherein the welding tool further includes a target attached to the welding tool, wherein the target further includes a plurality of point markers mounted thereon in a predetermined pattern, and wherein the predetermined pattern of point markers is operative to define a rigid body. The data capturing component further includes an imaging system for capturing images of the point markers and the imaging system further includes a plurality of digital cameras. At least one band-pass filter is incorporated into the optical sequence for each of the plurality of digital cameras for permitting light from only the wavelengths which are reflected or emitted from the point markers for improving image signal-to-noise ratio. The data processing component is operative to receive information from the data capturing component and then calculate the position and orientation of the operation path relative to the three-dimensional space viewable by the imaging system; the position of the tool point and orientation of the tool vector relative to the rigid body; and the position of the tool point and orientation of the tool vector relative to the operation path.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION

Figure 1:
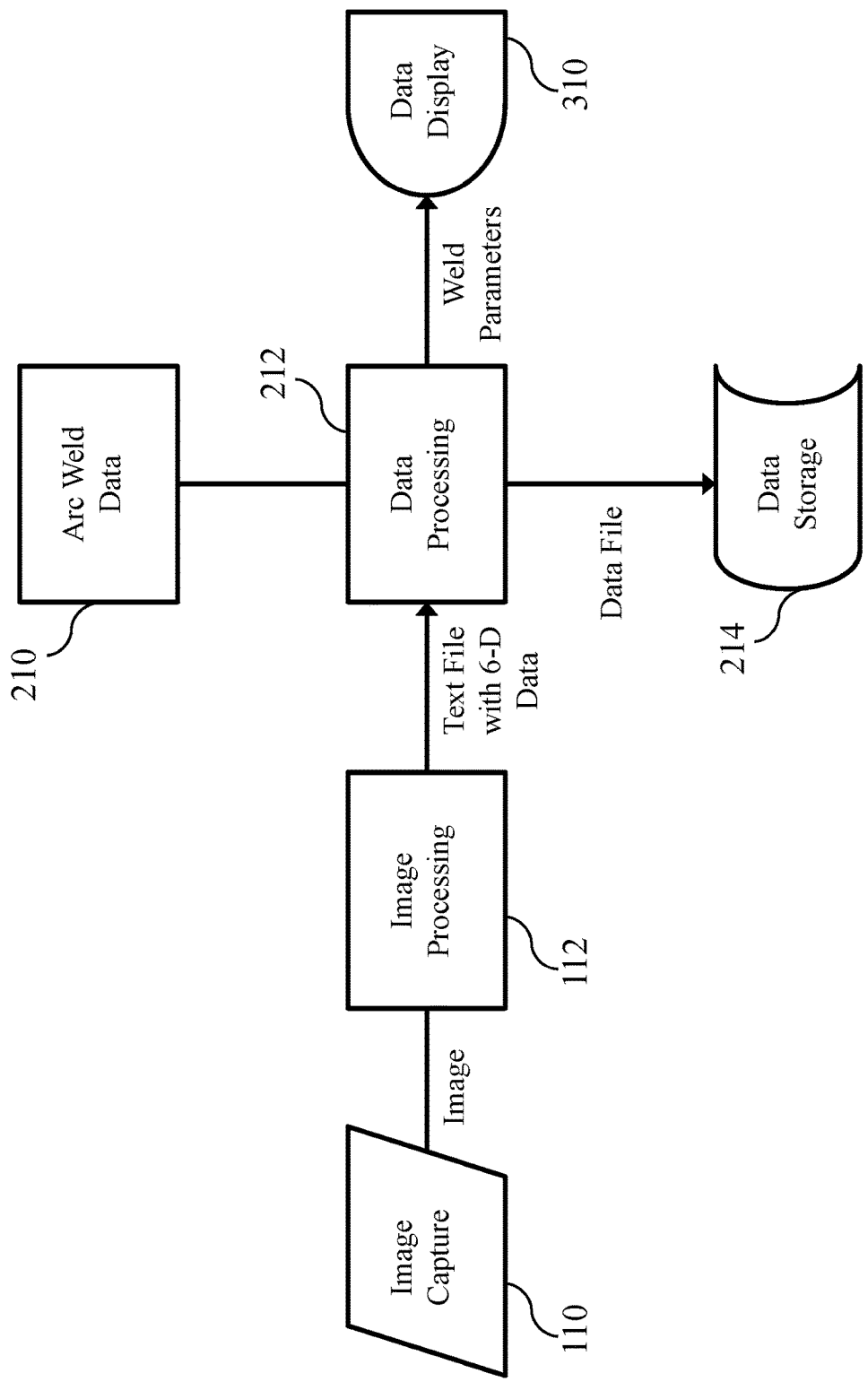
FIG. 1 is a flow chart illustrating the flow of information through the data processing and visualization component of an exemplary embodiment of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to an advanced system for observing and characterizing manual welding exercises and operations. This system is particularly useful for welding instruction and welder training that provides an affordable tool for measuring manual welding technique and comparing that technique with established procedures. The training applications of this invention include: (i) screening applicant skill levels; (ii) assessing trainee progress over time; (iii) providing real-time coaching to reduce training time and costs; and (iv) periodically re-testing welder skill levels with quantifiable results. Processing monitoring and quality control applications include: (i) identification of deviations from preferred conditions in real time; (ii) documenting and tracking compliance with procedures over time; (iii) capturing in-process data for statistical process control purposes (e.g., heat input measurements); and (iv) identifying welders needing additional training. The system of the present invention provides the unique benefit of enabling the determination of compliance with various accepted welding procedures.

The present invention, in various exemplary embodiments, measures torch motion and gathers process data during welding exercises using a single or multiple camera tracking system based on point cloud image analysis. This invention is applicable to a wide range of processes including, but not necessarily limited to, GMAW, FCAW, SMAW, GTAW, and cutting. The invention is expandable to a range of workpiece configurations, including large sizes, various joint types, pipe, plate, and complex shapes and assemblies. Measured parameters may include, but are not limited to, work angle, travel angle, tool standoff, travel speed, bead placement, weave, voltage, current, wire feed speed, arc length, heat input, gas flow (metered), contact tip to work distance (CTWD), and deposition rate (e.g., lbs./hr., in./run). The training component of the present invention may be pre-populated with specific welding procedures or it may be customized by an instructor. Data is automatically saved and recorded, a post-weld analysis scores performance, and progress is tracked over time. This system may be used throughout an entire welding training program. The system may be used to provide any type of feedback (typically in real time) including, but not limited to, one or more of in-helmet visual feedback, on-screen visual feedback, audio feedback (e.g., coaching), and welding tool (e.g., torch) visual, audio, or tactile feedback. With reference now to the Figures, one or more specific embodiments of this invention shall be described in greater detail.

As shown in FIG. 1, in an exemplary embodiment of the present invention, the basic flow of information through data generating component 100, data capturing component 200, and data processing (and visualization) component 300 of weld characterization system 10 occurs in six basic steps: (1) image capture 110; (2) image processing 112; (3) input of arc weld data 210, such as known or preferred weld parameters; (4) data processing 212; (5) data storage 214; and (5) data display 310. Image capture step 110 includes capturing images of a target 98 (which typically includes at least two point markers located in a fixed geometric relationship to one another) with one or more off-the-shelf high-speed-vision cameras, where the output aspect typically includes creating an image file at many (e.g., over 100) frames per second. The input aspect of image processing step 112 includes frame-by-frame point cloud analysis of a rigid body that includes three or more point markers (i.e., the calibrated target). Upon recognition of a known rigid body, position and orientation are calculated relative to the camera origin and the "trained" rigid body orientation. Capturing and comparing the images from two or more cameras allows for a substantially accurate determination of the rigid body position and orientation in three-dimensional space. Images are typically processed at a rate of more than 100 times per second. One of ordinary skill in the art will appreciate that a lesser sampling rate (e.g., 10 images/sec.) or a greater sampling rate (e.g., 1,000 images/sec.) could be used. The output aspect of image processing step 112 includes creation of a data array that includes x-axis, y-axis, and z-axis positional data and roll, pitch, and yaw orientation data, as well as time stamps and software flags. The text file (including the aforementioned 6D data) may be streamed or sent at a desired frequency. The input aspect of data processing step 212 includes raw positional and orientation data typically requested at a predetermined rate, while the output aspect includes transforming this raw data into useful welding parameters with algorithms specific to a selected process and joint type. The input aspect of data storage step 214 includes storing welding trial data (e.g., as a *.dat file), while the output aspect includes saving the data for review and tracking, saving the data for review on a monitor at a later time, and/or reviewing the progress of the student at a later time. Student progress may include, but is not limited to, total practice time, total arc time, total arc starts, and individual parameter-specific performance over time. The input aspect of data display step 310 includes welding trial data that may further include, but is not limited to, work angle, travel angle, tool standoff, travel speed, bead placement, weave, voltage, current, wire-feed speed, arc length, heat input, gas flow (metered), contact tip to work distance (CTWD), and deposition rate. The output aspect involves any type of feedback including, but not limited to, one or more of visual data that may be viewed on a monitor, in-helmet display, heads-up display, or combinations thereof; audio data (e.g., audio coaching); and tactile feedback. The feedback is typically presented in real time. The tracked parameters are plotted on a time-based axis and compared to upper and lower thresholds or preferred variations, such as those trained by recording the motions of an expert welder. One of ordinary skill in the art will appreciate that the general inventive concepts contemplate plotting the parameters on an axis that is not time-based, such as plotting or otherwise processing the parameters based on a length of the weld. Current and voltage may be measured in conjunction with travel speed to determine heat input, and the welding process parameters may be used to estimate arc length. Position data may be transformed into weld start position, weld stop position, weld length, weld sequence, welding progression, or combinations thereof and current and voltage may be measured in conjunction with travel speed to determine heat input.

Figure 2:
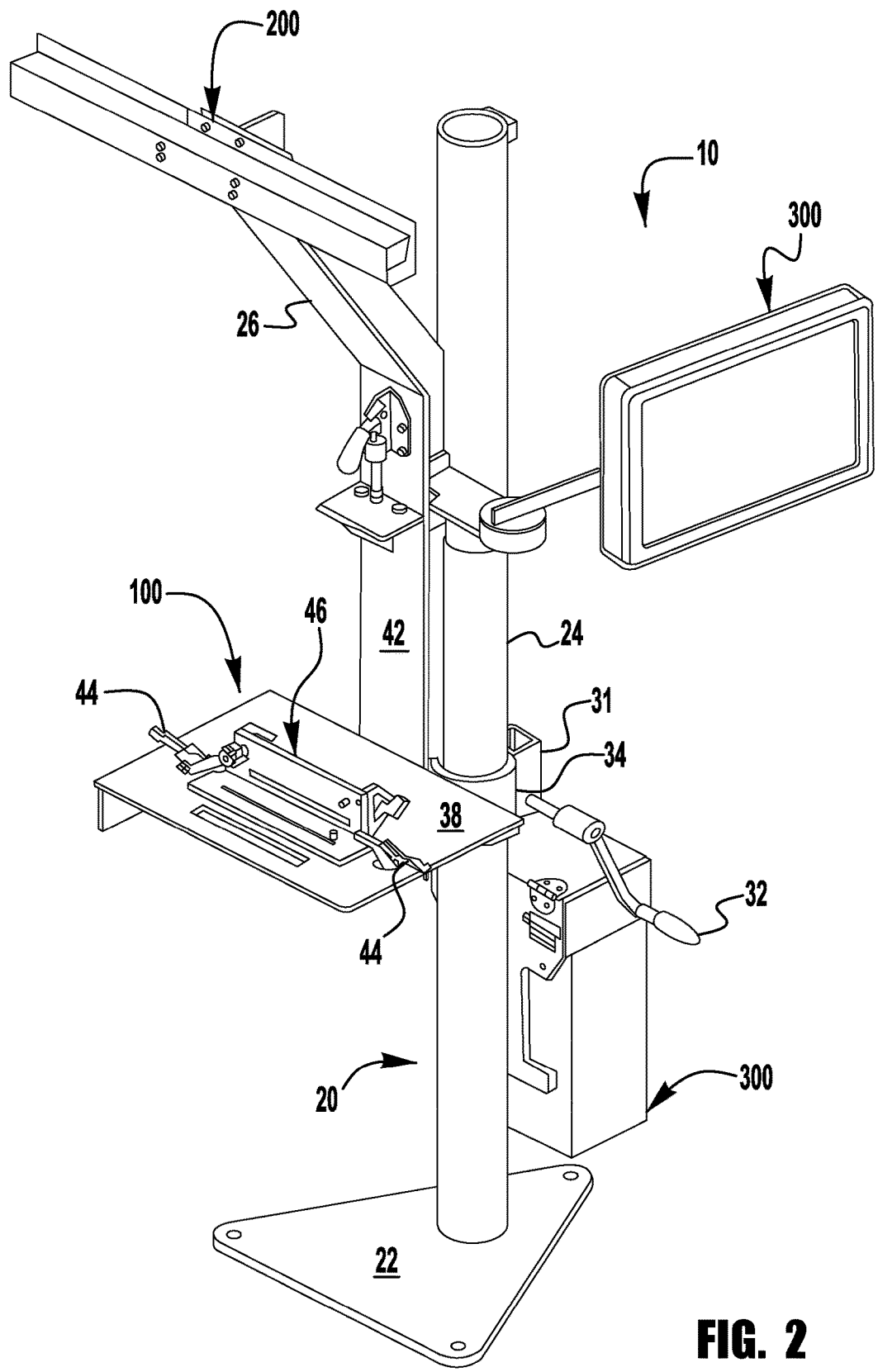
FIG. 2 provides an isometric view of a portable or semi-portable system for characterizing manual welding operations, in accordance with an exemplary embodiment of the present invention.

FIGS. 2-5 provide illustrative views of weld characterization system 10 in accordance with an exemplary embodiment the present invention. As shown in FIG. 2, portable training stand 20 includes a substantially flat base 22 for contact with a floor or other horizontal substrate, rigid vertical support column 24, camera or imaging device support 26, and rack and pinion assembly 31 for adjusting the height of imaging device support 26. In most embodiments, weld characterization system 10 is intended to be portable or at least moveable from one location to another, therefore the overall footprint of base 22 is relatively small to permit maximum flexibility with regard to installation and use. As shown in FIG. 2-6, weld characterization system 10 may be used for training exercises that include any suitable arrangement of workpieces including, but not limited to, flat, horizontally, vertically, overhead, and out-of-position oriented workpieces. In the exemplary embodiments shown in the Figures, training stand 20 is depicted as a unitary or integrated structure that is capable of supporting the other components of system. In other embodiments, stand 20 is absent and the various components of the system are supported by whatever suitable structural or supportive means may be available. Thus, within the context of this invention, "stand" 20 is defined as any single structure or, alternately, multiple structures that are capable of supporting the components of weld characterization system 10.

Figure 3:
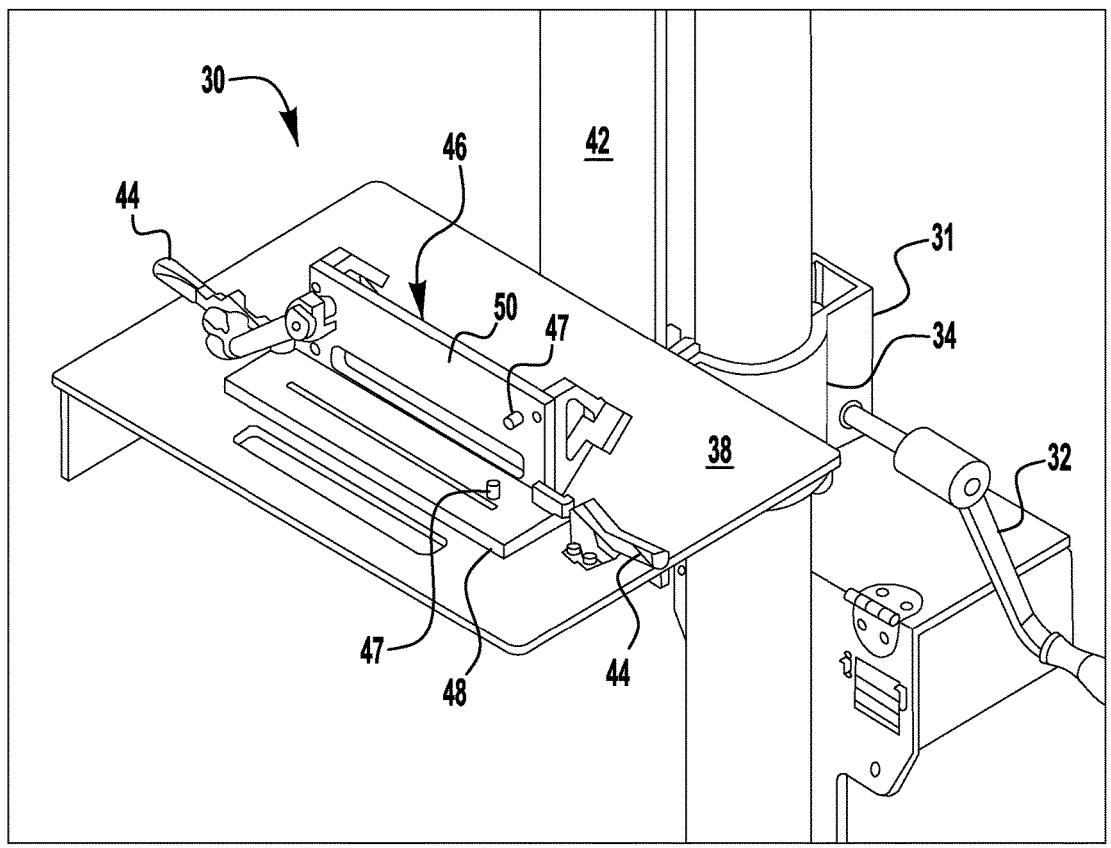
FIG. 3 provides an isometric view of the flat assembly of the system of FIG. 2.
Figure 4:
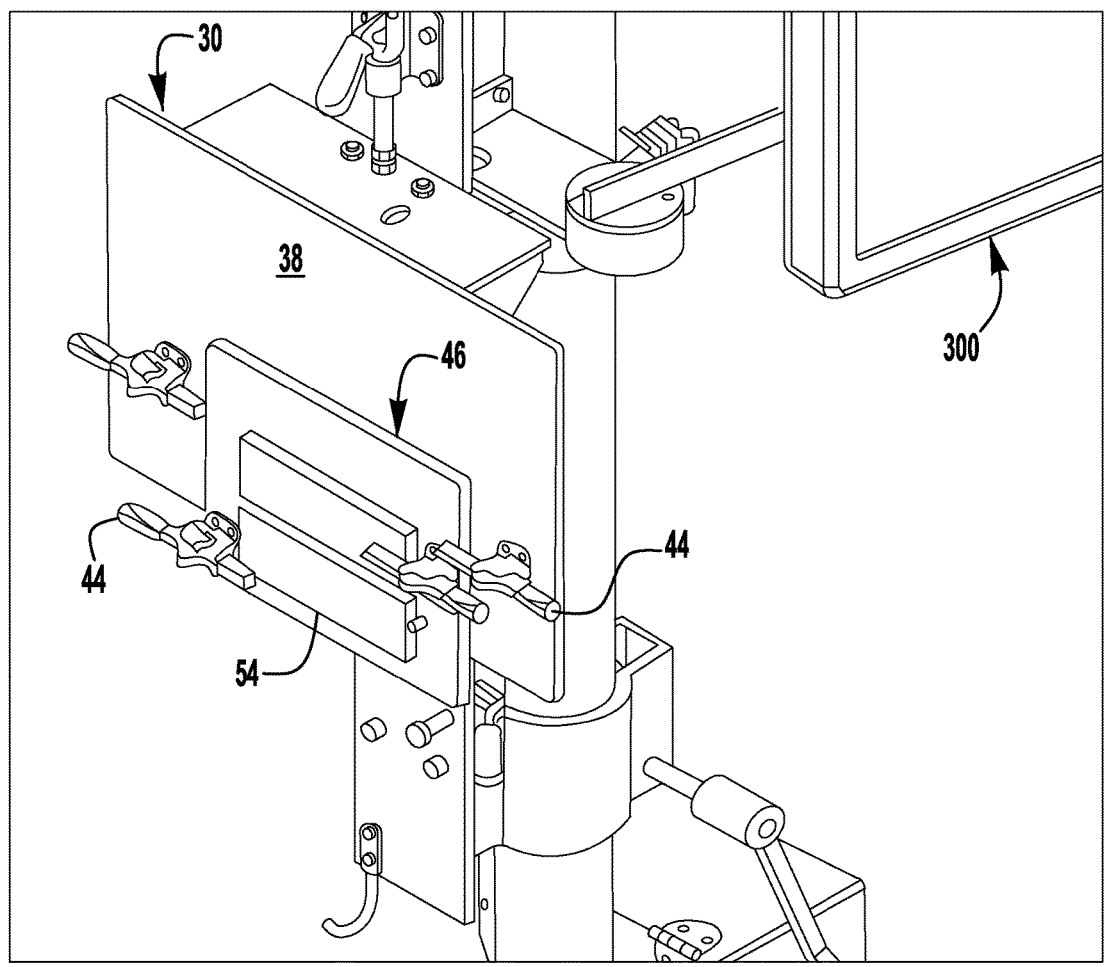
FIG. 4 provides an isometric view of the horizontal assembly of the system of FIG. 2.
Figure 5:
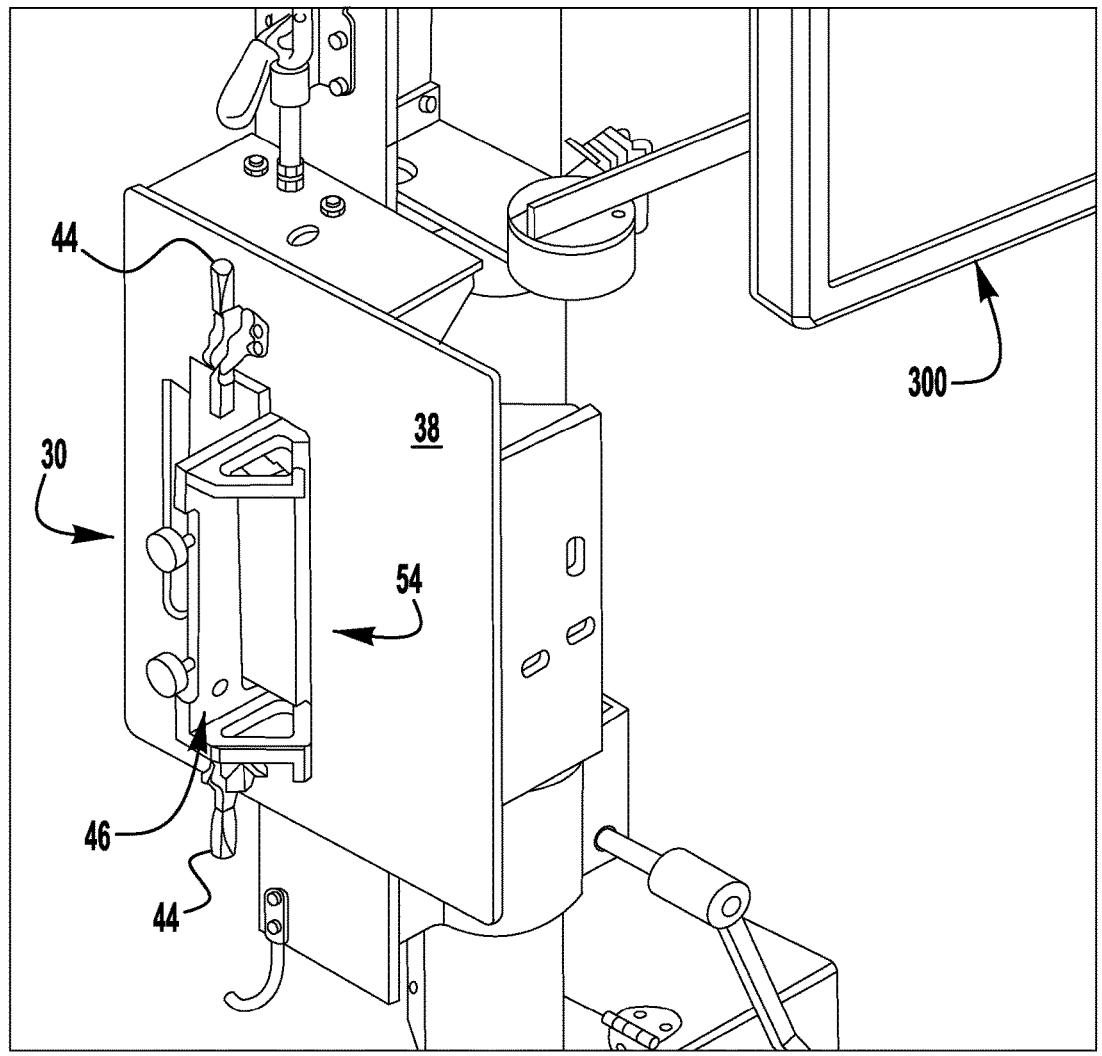
FIG. 5 provides an isometric view of the vertical assembly of the system of FIG. 2.

With reference to FIGS. 2-3, certain welding exercises will utilize a flat assembly 30, which is slidably attached to vertical support column 24 by collar 34, which slides upward or downward on support column 24. Collar 34 is further supported on column 24 by rack and pinion 31, which includes shaft 32 for moving rack and pinion assembly 31 upward or downward on support column 24. Flat assembly 30 includes training platform 38, which is supported by one or more brackets (not visible). In some embodiments, a shield 42 is attached to training platform 38 for protecting the surface of support column 24 from heat damage. Training platform 38 further includes at least one clamp 44 for securing weld position-specific fixture/jig 46 to the surface of the training platform. The structural configuration or general characteristics of weld position-specific jig 46 are variable based on the type of weld process that is the subject of a particular welding exercise, and in FIGS. 2-3, fixture 46 is configured for a fillet weld exercise. In the exemplary embodiment shown in FIGS. 2-3, first 48 and second 50 structural components of weld position-specific fixture 46 are set at right angles to one another. Position-specific fixture 46 may include one or more pegs 47 for facilitating proper placement of a weld coupon (workpiece) 54 on the fixture. The characteristics of any weld coupon 54 used with system 10 are variable based on the type of manual welding process that is the subject of a particular training exercise and in the exemplary embodiment shown in the FIGS. 7-8, first 56 and second 58 portions of weld coupon 54 are also set at right angles to one another. With reference to FIGS. 4-5, certain other welding exercises will utilize a horizontal assembly 30 (see FIG. 4) or a vertical assembly 30 (see FIG. 5). In FIG. 4, horizontal assembly 30 supports butt fixture 46, which holds workpiece 54 in the proper position for a butt weld exercise. In FIG. 5, vertical assembly 30 supports vertical fixture 46, which holds workpiece 54 in the proper position for a lap weld exercise.

Data processing component 300 of the present invention typically includes at least one computer for receiving and analyzing information captured by the data capturing component 200, which itself includes at least one digital camera contained in a protective housing. During operation of weld characterization system 10, this computer is typically running software that includes a training regimen module, an image processing and rigid body analysis module, and a data processing module. The training regimen module includes a variety of weld types and a series of acceptable welding process parameters associated with creating each weld type. Any number of known or AWS weld joint types and the acceptable parameters associated with these weld joint types may be included in the training regimen module, which is accessed and configured by a course instructor prior to the beginning of a training exercise. The weld process and/or type selected by the instructor determine which weld process-specific fixture, calibration device, and weld coupon are used for any given training exercise. The object recognition module is operative to train the system to recognize a known rigid body target 98 (which includes two or more point markers) and then to use target 98 to calculate positional and orientation data for welding gun 90 as an actual manual weld is completed by a trainee. The data processing module compares the information in the training regimen module to the information processed by the object recognition module and outputs the comparative data to a display device such as a monitor or heads-up display. The monitor allows the trainee to visualize the processed data in real time and the visualized data is operative to provide the trainee with useful feedback regarding the characteristics and quality of the weld. The visual interface of weld characterization system 10 may include a variety of features related to the input of information, login, setup, calibration, practice, analysis, and progress tracking. The analysis screen typically displays the welding parameters found in the training regimen module, including (but not limited to) work angle, travel angle, tool standoff, travel speed, bead placement, weave, voltage, current, wire-feed speed, arc length, heat input, gas flow (metered), contact tip to work distance (CTWD), and deposition rate (e.g., lbs./hr., in./run). Multiple display variations are possible with the present invention.

In most, if not all instances, weld characterization system 10 will be subjected to a series of calibration steps/processes prior to use. Some of the aspects of the system calibration will typically be performed by the manufacturer of system 10 prior to delivery to a customer and other aspects of the system calibration will typically be performed by the user of weld characterization system 10 prior to any welding training exercises. System calibration typically involves two related and integral calibration processes: (i) determining the three-dimensional position and orientation of the operation path to be created on a workpiece for each joint/position combination to be used in various welding training exercises; and (ii) determining the three-dimensional position and orientation of the welding tool by calculating the relationship between a plurality of passive (e.g., reflective) or active (e.g., light emitting) point markers located on target 98 and at least two key points represented by point markers located on the welding tool 90.

Figure 6:
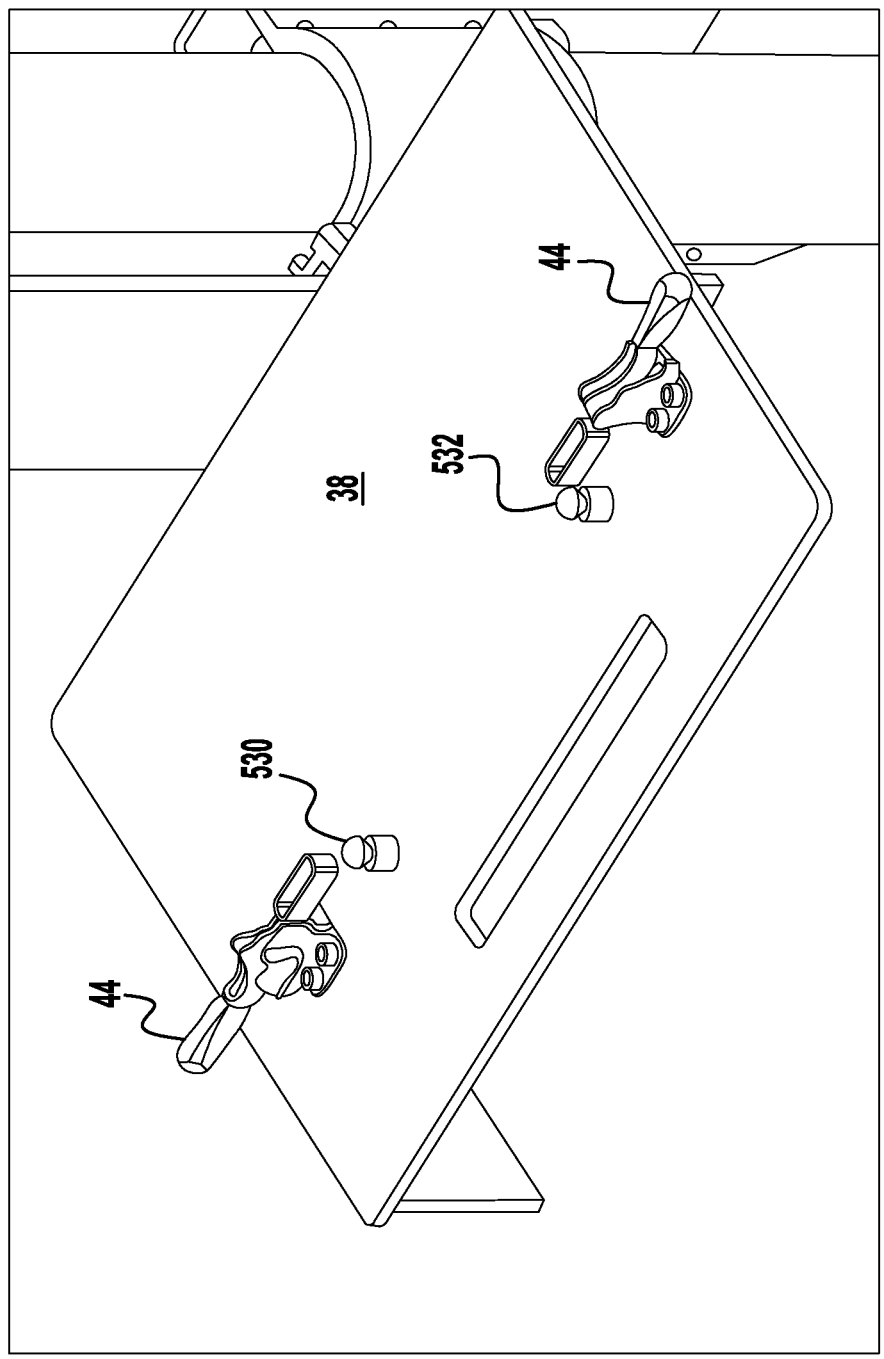
FIG. 6 illustrates the placement of two point markers on the flat assembly of FIG. 2.
Figure 7:
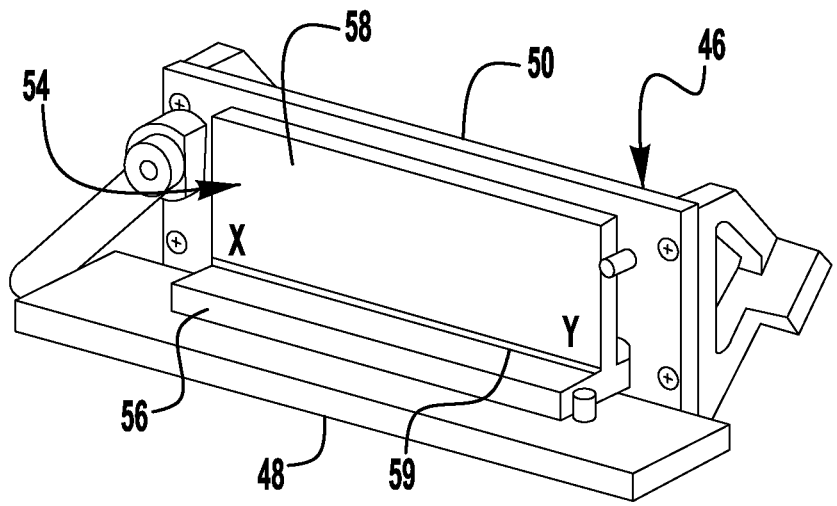
FIG. 7 illustrates an exemplary workpiece operation path.
Figure 8:
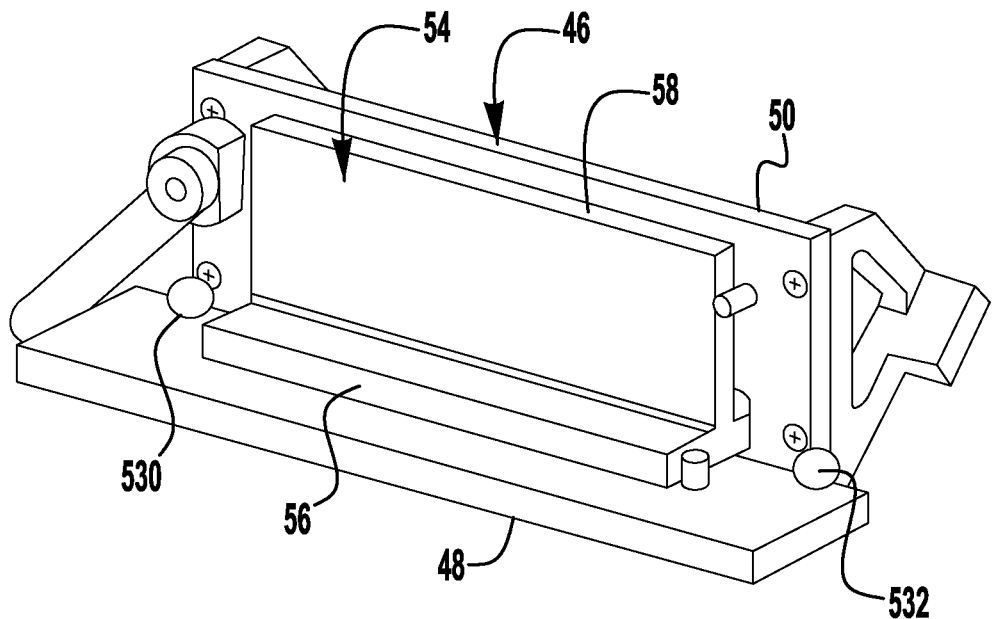
FIG. 8 illustrates the placement of two active or passive point markers on an exemplary workpiece for determining a workpiece operation path.

The first calibration aspect of this invention typically involves the calibration of the welding operation with respect to the global coordinate system, i.e., relative to the other structural components of weld characterization system 10 and the three-dimensional space occupied thereby. Prior to tracking/characterizing a manual welding exercise, the global coordinates of each desired operation path (i.e., vector) on any given workpiece will be determined. In some embodiments, this is a factory-executed calibration process that will include corresponding configuration files stored on data processing component 200. In other embodiments, the calibration process could be executed in the field (i.e., on site). To obtain the desired vectors, a calibration device containing active or passive markers may be inserted on at least two locating markers in each of the various platform positions (e.g., flat, horizontal, and vertical). FIGS. 6-8 illustrate this calibration step in one possible platform position. Joint-specific fixture 46 includes first and second structural components 48 (horizontal) and 50 (vertical), respectively. Weld coupon or workpiece 54 includes first and second portions 56 (horizontal) and 58 (vertical), respectively. One of ordinary skill in the art will appreciate that the general inventive concepts extend to any suitable jig/coupon configurations and orientations. For example, in some exemplary embodiments, jig or joint calibration could be performed using a handheld or removable device that would "teach" the software points (i.e., positions) to determine the operation path. In this manner, use of the two or more points would allow the weldment to be oriented in any position.

Workpiece operation path extends from point X to point Y and is shown as double line 59 in FIG. 7. Locating point markers 530 and 532 are placed as shown in FIG. 6 (and FIG. 8), and the location of each marker is obtained using data capturing component 100. Any suitable data capturing system can be used, for example, the Optitrack Tracking Tools (provided by NaturalPoint, Inc. of Corvallis, Oreg.) or a similar commercially available or proprietary hardware/software system that provides three-dimensional marker and six degrees of freedom object motion tracking in real time. Such technologies typically utilize reflective and/or light emitting point markers arranged in predetermined patterns to create point clouds that are interpreted by system imaging hardware and system software as "rigid bodies," although other suitable methodologies are compatible with this invention.

Figure 9:
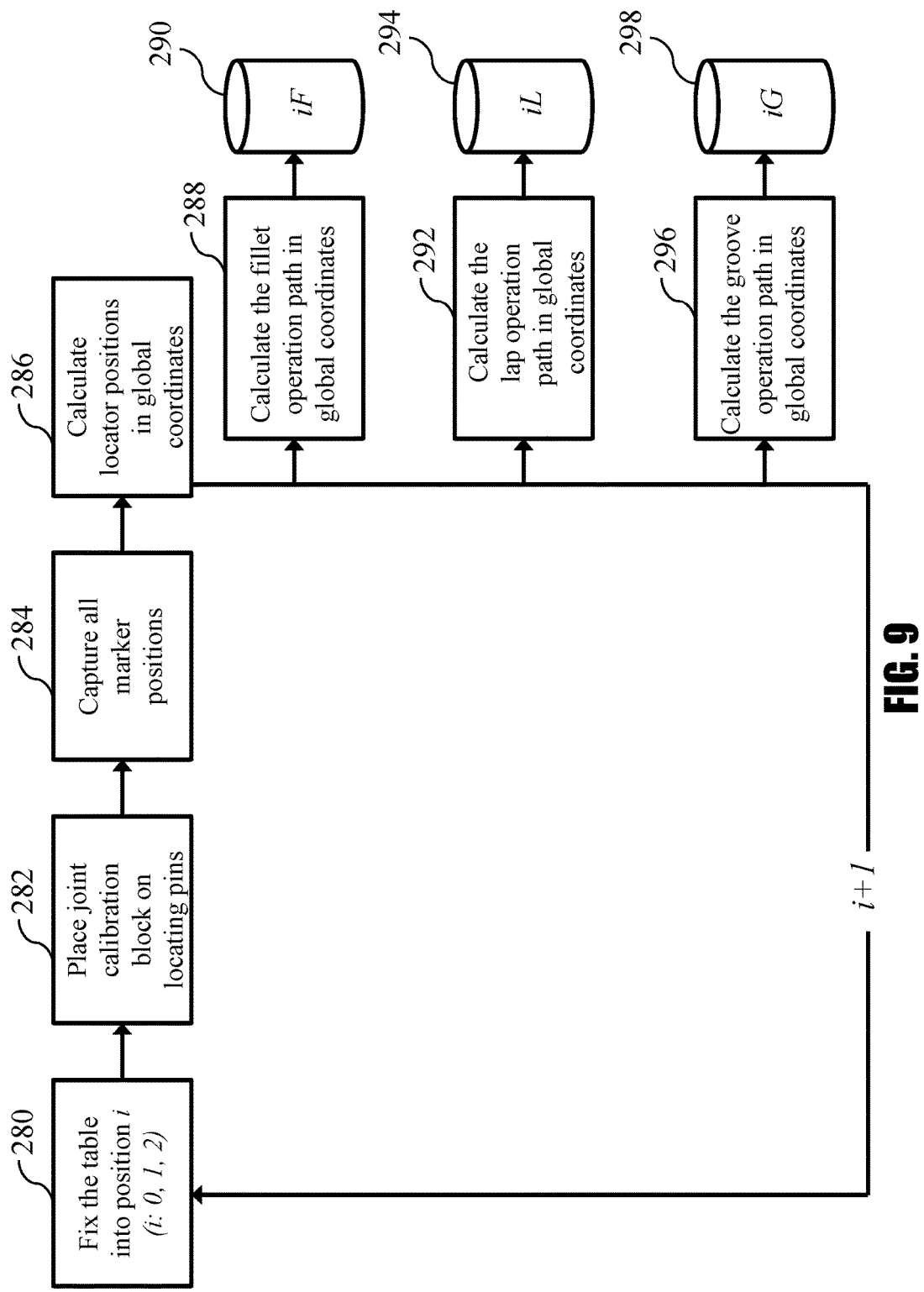
FIG. 9 is a flowchart detailing the process steps involved in an exemplary embodiment of a first calibration component of the present invention.

In the calibration process represented by the flowchart of FIG. 9, table 38 is fixed into position i (0,1,2) at step 280; a calibration device is placed on locating pins at step 282; all marker positions are captured at step 284; coordinates for the locator positions are calculated at step 286; coordinates for the fillet operation path are calculated at step 288 and stored at 290; coordinates for the lap operation path are calculated at step 292 and stored at 294; and coordinates for the groove operation path are calculated at step 296 and stored at 298. All coordinates are calculated relative to the three dimensional space viewable by data capturing component 200.

In one embodiment of this invention, the position and orientation of the workpiece is calibrated through the application of two or more passive or active point markers to a calibration device that is placed at a known translational and rotational offset to a fixture that holds the workpiece at a known translational and rotational offset. In another embodiment of this invention, the position and orientation of the workpiece is calibrated through the application of two or more passive or active point markers to a fixture that holds the workpiece at a known translational and rotational offset. In still other embodiments, the workpiece is non-linear, and the position and orientation thereof may be mapped using a calibration tool with two or more passive or active point markers and stored for later use. The position and orientation of the workpiece operation path may undergo a pre-determined translational and rotational offset from its original calibration plane based on the sequence steps in the overall work operation.

In some exemplary embodiments, data on weldments in electronic format (e.g., rendered in CAD) are extracted and used in determining position and/or orientation of the workpiece. Additionally, an associated welding procedure specification (WPS) that specifies welding parameters for the weldment is also processed. In this manner, the system can map the CAD drawing and WPS for use in assessing (in real time) compliance with the WPS.

Important tool manipulation parameters such as position, orientation, velocity, acceleration, and spatial relationship to the workpiece operation path may be determined from the analysis of consecutive tool positions and orientations over time and the various workpiece operation paths described above. Tool manipulation parameters may be compared with pre-determined preferred values to determine deviations from known and preferred procedures. Tool manipulation parameters may also be combined with other manufacturing process parameters to determine deviations from preferred procedures, and these deviations may be used for assessing skill level, providing feedback for training, assessing progress toward a skill goal, or for quality control purposes. Recorded motion parameters relative to the workpiece operation path may be aggregated from multiple operations for statistical process control purposes. Deviations from preferred procedures may be aggregated from multiple operations for statistical process control purposes. Important tool manipulation parameters and tool positions and orientations with respect to the workpiece operation path may also be recorded for establishing a signature of an experienced operator's motions to be used as a baseline for assessing compliance with preferred procedures.

Figure 10:
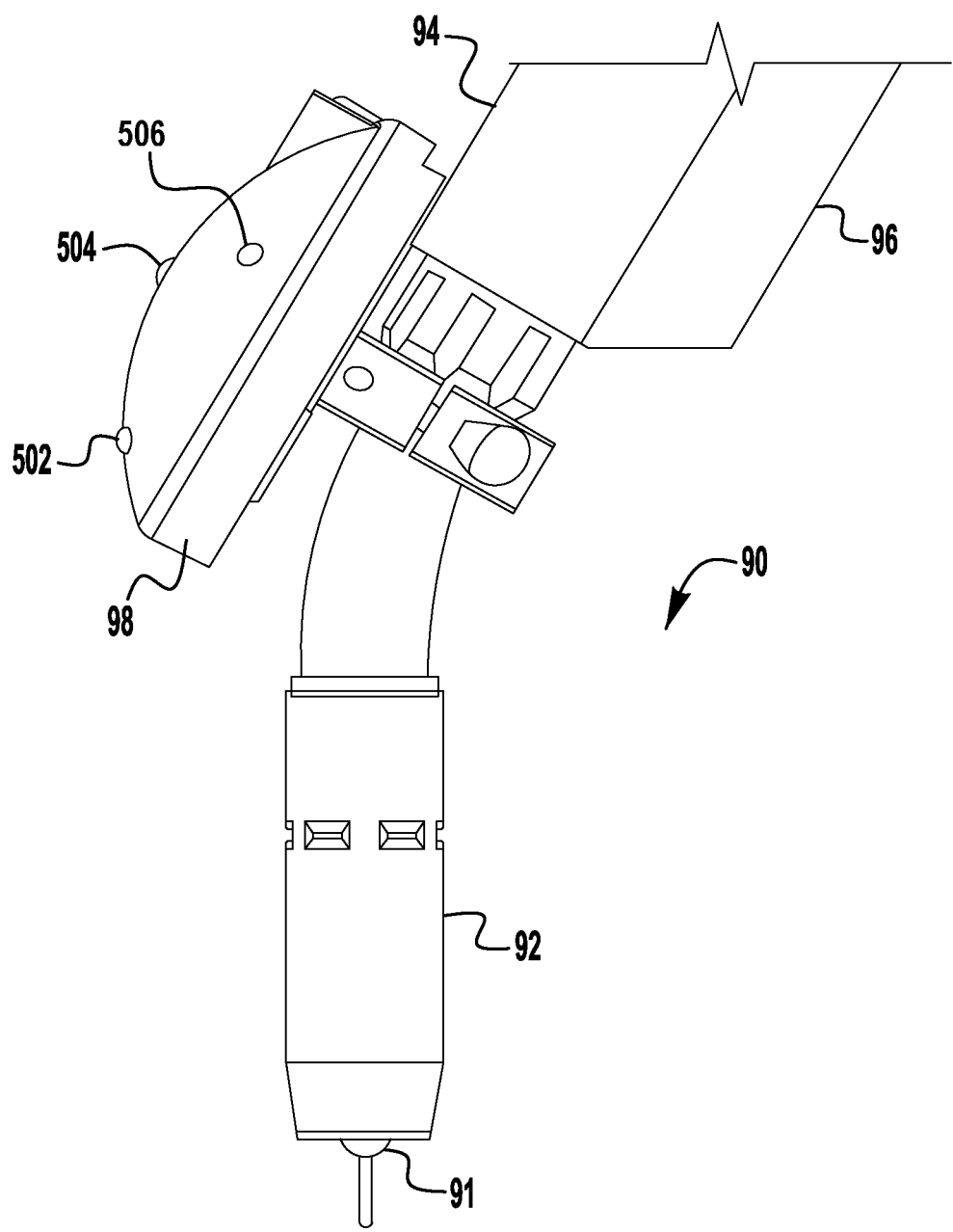
FIG. 10 illustrates the welding tool of an exemplary embodiment of this invention showing the placement of the point markers used to define the rigid body.
Figure 11:
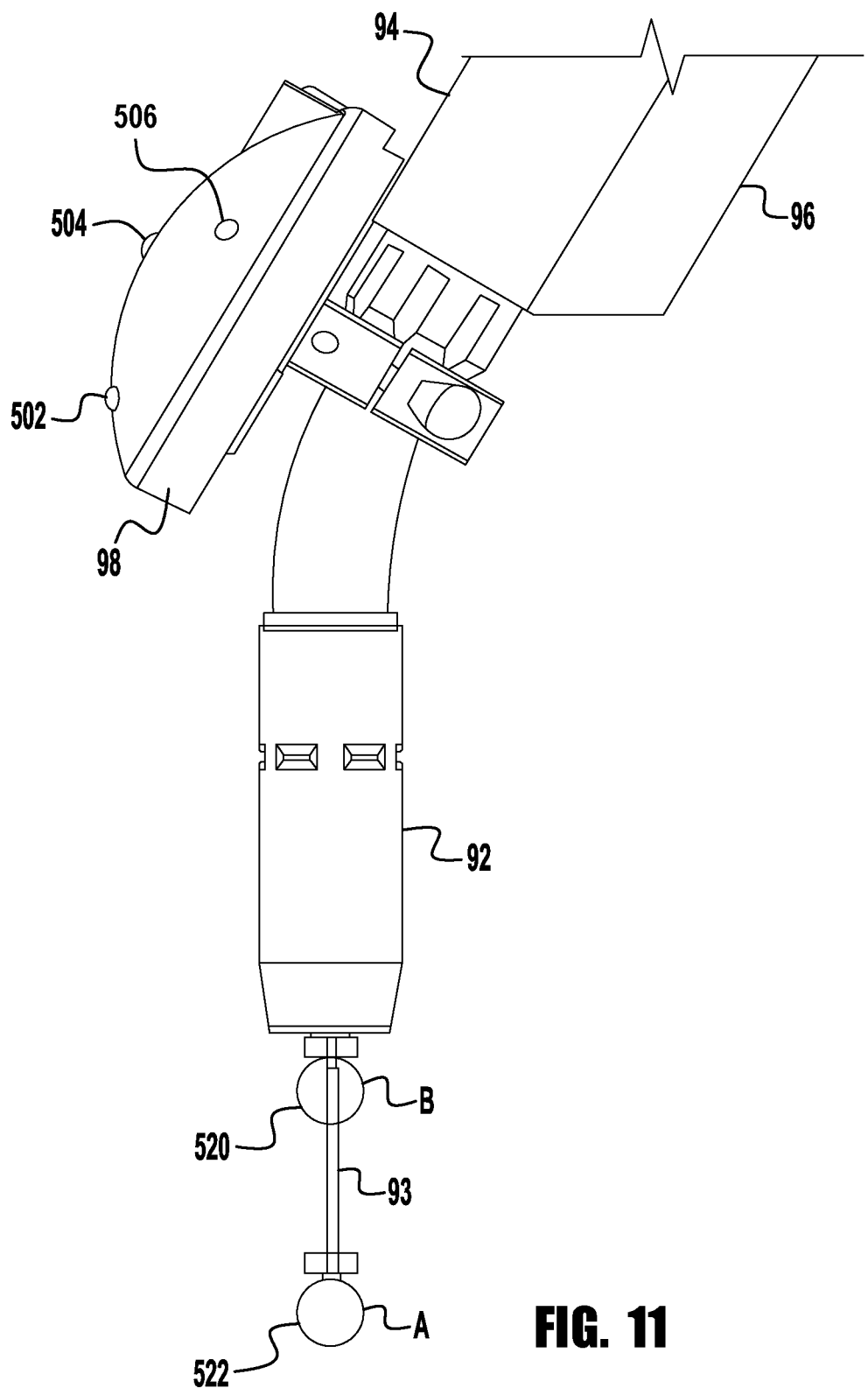
FIG. 11 illustrates the welding tool of an exemplary embodiment of this invention showing the placement of the point markers used to define the tool vector and the rigid body.

The second calibration aspect typically involves the calibration of the welding tool 90 with respect to the target 98. The welding tool 90 is typically a welding torch or gun or SMAW electrode holder, but may also be any number of other implements including a soldering iron, cutting torch, forming tool, material removal tool, paint gun, or wrench. With reference to FIGS. 10-11, welding gun/tool 90 includes tool point 91, nozzle 92, body 94, trigger 96, and target 98. A tool calibration device 93, which includes two integrated active or passive point markers in the A and B positions (see FIG. 11) is attached to, inserted into, or otherwise interfaced with the nozzle 92. For example, the tool point 91 can be machined off so that the tool calibration device 93 can be threaded into the nozzle 92 of the welding tool 90 for calibration purposes.

Figure 11A:
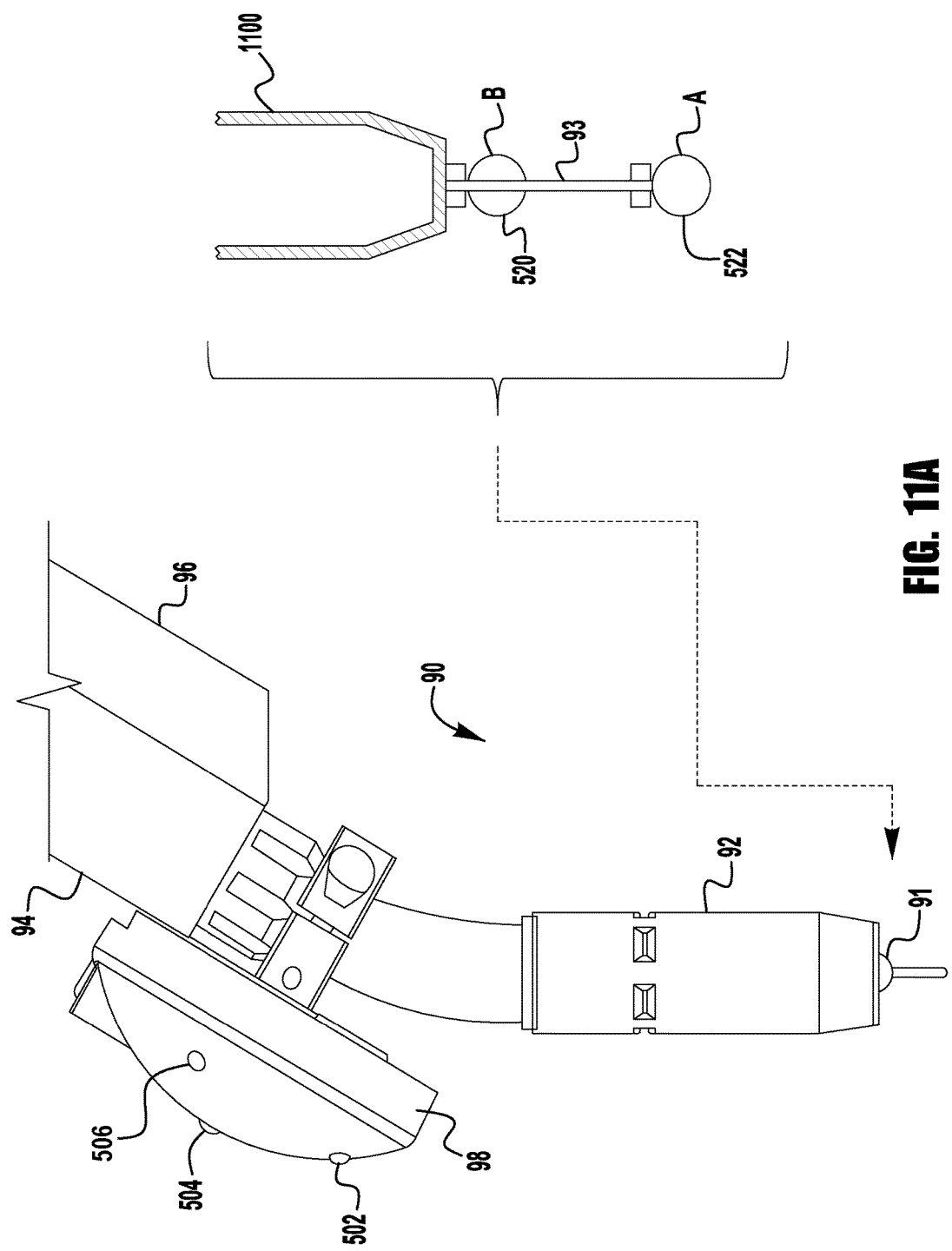
FIG. 11A illustrates the welding tool of FIG. 10, along with an exemplary tool calibration device for interfacing thererwith.

In another exemplary embodiment, the tool calibration device 93 is affixed to a sleeve 1100 as shown in FIG. 11A. The sleeve 1100 can be shaped and sized so as to fit over at least a portion of the nozzle 92 of the welding tool 90. In some embodiments, the sleeve 1100 can fit over the nozzle 92 without requiring removal of the tool point 91. In some exemplary embodiments, the sleeve 1100 fits over or otherwise interfaces with a part of the welding tool 90 other than the nozzle 92. The sleeve 1100 removably connects to the welding tool 90 in any suitable matter, for example, by friction fit, threads, etc. The sleeve 1100 can be shaped and sized so as to fit over a plurality of different welding tools, without requiring modification of said welding tools. In this manner, the sleeve 1100 and the attached tool calibration device 93 form a type of "universal" tool calibration device.

Additionally, a rigid body point cloud (i.e., a "rigid body") is constructed by attaching active or passive point markers 502, 504, and 506 (and possibly additional point markers) to the upper surface of target 98.

As described herein, other point marker placements are possible and fall within the scope of the general inventive concepts. Target 98 may include a power input if the point markers used are active and require a power source. Data capturing component 200 uses a tracking system (e.g., the aforementioned Optitrack Tracking Tools) or similar hardware/software to locate the rigid body and point markers 522 (A) and 520 (B), which represent the location of a tool vector. These positions can be extracted from the software of system 10 and the relationship between point markers A and B and the rigid body can be calculated.

Figure 12:
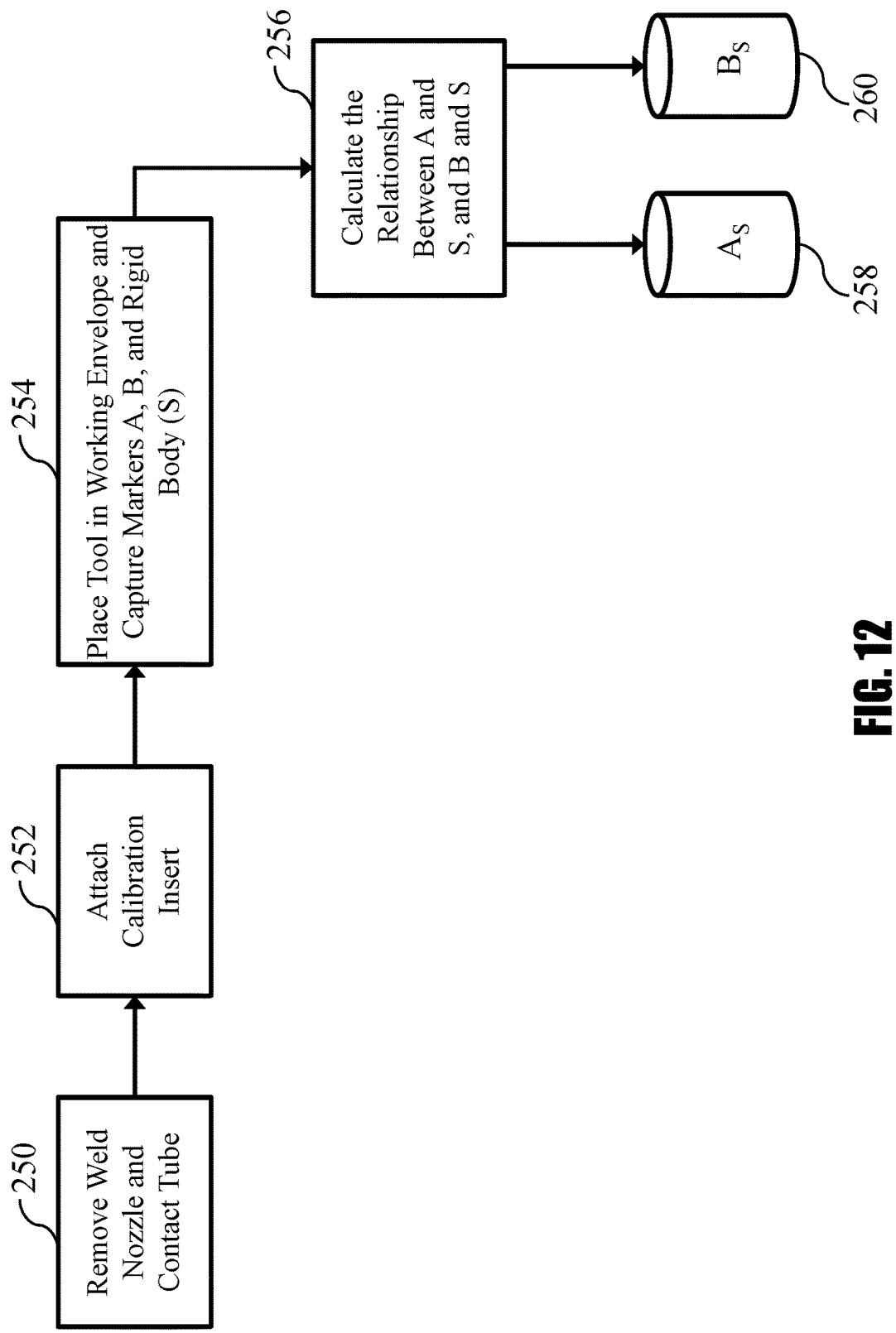
FIG. 12 is a flowchart detailing the process steps involved in an exemplary embodiment of a second calibration component of the present invention.

In the exemplary calibration process represented by the flowchart of FIG. 12, weld nozzle 92 and the contact tube 91 are removed at step 250; the calibration device is inserted into body 94 at step 252; weld tool 90 is placed in the working envelope and rigid body (designated as "S" in FIG. 12) and point markers A and B are captured by data capturing component 100; and the relationships between A and S and B and S are calculated at step 256; with relationship data for $A_s$ being stored at 258 and relationship data for $B_s$ being stored at 260.

In one embodiment of this invention, calibration of the tool point and tool vector is performed through the application of two or more passive or active point markers to the calibration device at locations along the tool vector with a known offset to the tool point. In another embodiment, calibration of the tool point and tool vector is performed by inserting the tool into a calibration block of known position and orientation relative to the workpiece. For example, calibration of the tool point and tool vector can be performed by inserting the tool point 91 into the weld joint in a particular manner.

With regard to the rigid body defined by the point markers (e.g., 502, 504, 506), in one embodiment, the passive or active point markers are affixed to the tool in a multi-faceted manner so that a wide range of rotation and orientation changes can be accommodated within the field of view of the imaging system. In another embodiment, the passive or active point markers are affixed to the tool in a spherical manner so that a wide range of rotation and orientation changes can be accommodated within the field of view of the imaging system. In still another embodiment, the passive or active point markers are affixed to the tool in a ring shape so that a wide range of rotation and orientation changes can be accommodated within the field of view of the imaging system.

Numerous additional useful features may be incorporated into the present invention. For example, for purposes of image filtering, band-pass or high-pass filters may be incorporated into the optical sequence for each of the plurality of digital cameras in data capturing component 200 for permitting light from only the wavelengths which are reflected or emitted from the point markers to improve image signal-to-noise ratio. Spurious data may be rejected by analyzing only image information obtained from within a dynamic region of interest having a limited offset from a previously known rigid-body locality. This dynamic region of interest may be incorporated into or otherwise predefined (i.e., preprogrammed as a box or region of width x and height y and centered on known positions of target 98) within the field of view of each digital camera such that image information is only processed from this predefined region. The region of interest will change as the rigid body moves and is therefore based on previously known locations of the rigid body. This approach allows the imaging system to view only pixels within the dynamic region of interest when searching for point markers while disregarding or blocking pixels in the larger image frame that are not included in the dynamic region of interest. Decreased processing time is a benefit of this aspect of the invention.

In some embodiments of the present invention, the position and orientation of the operation path, or a predetermined segment thereof, relative to the three-dimensional space viewable by the imaging system is obtained from a three-dimensional CAD model, the coordinate system of which is known relative to the coordinate system of the imaging system. The three-dimensional CAD model may also contain a definition of linear or curvilinear points which define the operation path segment and at least three calibration points are located on both the three-dimensional CAD model and on the fixture. A position and orientation shift may be applied to the three-dimensional CAD model by measuring the position of the at least three calibration points on the fixture with the imaging system and then comparing the measurements to the original calibration points of the three-dimensional CAD model. In other embodiments, the position and orientation of the linear or curvilinear operation path, or a predetermined segment thereof, relative to the three-dimensional space viewable by the imaging system may obtained using a three-dimensional CAD model, wherein the coordinate system of the three-dimensional CAD model relative to the coordinate system of the imaging system is predetermined, and wherein the weld locations on the three-dimensional CAD model are pre-defined. Regarding the CAD model creation, there is typically a one-to-one relationship between the CAD model and the part in question and a sequence of calibration may be an aspect of the welding exercise. The model exists is virtual space and the user instructs the system as to the location of the two points. A linkage is created to eliminate any variance between the CAD model and the part or particular datum on tooling is utilized. A procedure to teach the system offline may also be included.

One definition of an operation path for this invention describes a single continuous path for operation. In certain embodiments, the operation path is divided into separate segments for welds that traverse corners or change in general direction. In this context, points make up an operation path segment (at least two), and contiguous operation path segments make up an operation path chain. Thus, the position and orientation of the operation path may be made up of one or more operation path segments that form a chain, and consecutive segments share an operation path point at the end of one segment and the start of the next segment. In such embodiments, the system provides the ability to move between multiple calibration planes; each operation plane depends on which calibration plane is being utilized, and each operation path is tied to a predetermined coordinate system.

Furthermore, the exemplary weld characterization system 10 of FIG. 2 can be modified to better process the case of a round (e.g., circular) operation path, such as with pipe welding, and/or a more complex assembly of workpieces.

Figure 13:
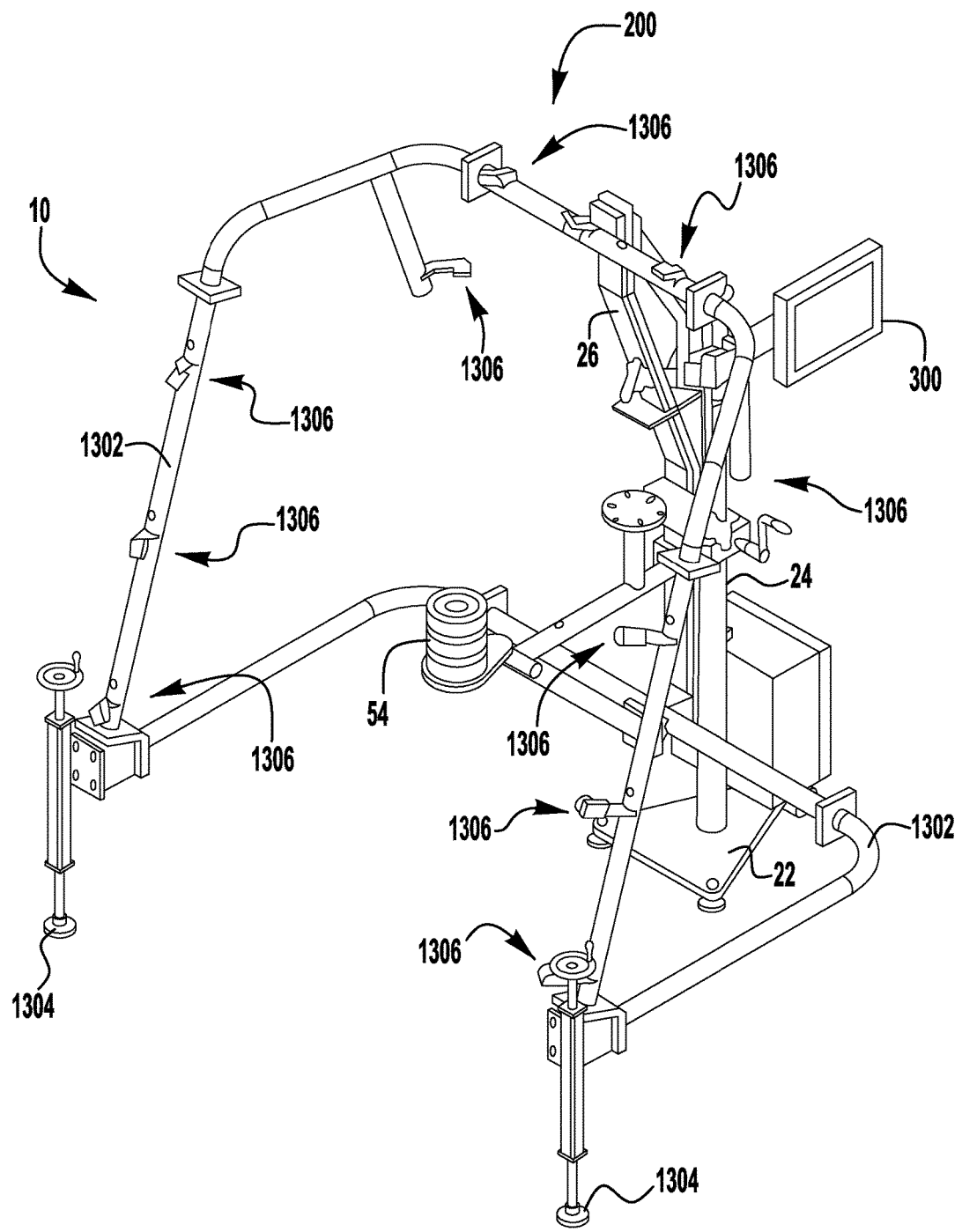
FIG. 13 provides an isometric view of a portable or semi-portable system for characterizing manual welding operations, in accordance with an exemplary embodiment of the present invention.

As shown in FIG. 13, the weld characterization system 10 includes a training stand similar or identical to the stand 20 shown in FIG. 2, having the substantially flat base 22. Furthermore, a frame 1302, cage, or the like is also interfaced with the stand 20 (either directly or indirectly). For example, the frame 1302 could be connected to the camera or imaging device support 26.

In some embodiments, the frame 1302 can be readily separated from the stand 20 to promote the portability of the system 10. The frame 1302 includes one or more legs 1304 for further supporting the frame 1302, along with the stand 20. The legs 1304 may be height-adjustable. The frame defines various locations as which cameras (e.g., digital high-speed-vision cameras) can be mounted. As shown in FIG. 13, a plurality of cameras 1306 are mounted on the frame 1302 as various locations (and elevations) around the workpiece 54. In this manner, the frame 1302 at least partially surrounds the workpiece 54. In some exemplary embodiments, at least half of the workpiece 54 (i.e., 180 degrees in the case of a pipe) is surrounded by the frame 1302. In some exemplary embodiments, at least 75% of the workpiece 54 (i.e., 270 degrees in the case of a pipe) is surrounded by the frame 1302. In some exemplary embodiments, substantially all (i.e., ~100%) of the workpiece 54 is surrounded by the frame 1302.

The cameras 1306 form part of the data capturing component 200. In some exemplary embodiments, the weld characterization system 10 includes 2 or more (e.g., 2-20) cameras. In some exemplary embodiments, the weld characterization system 10 includes 4 or more cameras, 5 or more cameras, 6 or more cameras, 7 or more cameras, 8 or more cameras, 9 or more cameras, 10 or more cameras, 11 or more cameras, or 12 or more cameras. In some exemplary embodiments, the weld characterization system 10 includes at least 4 cameras, at least 5 cameras, at least 6 cameras, at least 7 cameras, at least 8 cameras, at least 9 cameras, at least 10 cameras, at least 11 cameras, or at least 12 cameras. After calibration of the cameras (as needed), the weld coupon 54 and the welding tool 10 are calibrated as described herein. The distribution of the cameras 1306 around the workpiece 54 (e.g., a pipe) allow for the accurate tracking of welding operations on the workpiece 54.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

The invention claimed is:

1. A support frame for a welding system, the support frame comprising:
   (a) a stand including:
      (i) a base;
      (ii) a vertical support column extending from the base; and
      (iii) a flat assembly extending from the support column, the flat assembly operable to support a workpiece including at least one joint to be welded; and
   (b) a cage having a plurality of mounts, each of the mounts being operable to removably attach a camera at a different location on the cage;
   wherein a first camera is mounted to the cage using one of the mounts at a first location on the cage;
   wherein a second camera is mounted to the cage using one of the mounts at a second location on the cage;
   wherein a third camera is mounted to the cage using one of the mounts at a third location on the cage;
   wherein the cage is operable to assume one of multiple positions relative to the stand; and
   wherein movement of the cage simultaneously moves the first camera, the second camera, and the third camera in relation to the stand.

2. The support frame of claim 1, wherein the flat assembly is connected to the support column by a collar, and
   wherein the collar is operable to slide on the support column between a first position and at least one second position.

3. The support frame of claim 1, wherein the flat assembly includes at least one clamp for securing the workpiece thereon.

4. The support frame of claim 1, wherein the flat assembly is perpendicular to the support column.

5. The support frame of claim 1, wherein the flat assembly is parallel to the support column.

6. The support frame of claim 1, wherein the flat assembly is operable to assume a plurality of different positions.

7. The support frame of claim 1, wherein the stand includes a computer mounted thereon, the computer operable to receive data from the first camera, the second camera, and the third camera.

8. The support frame of claim 7, wherein the stand includes a monitor mounted thereon, the monitor operable to display data from the computer.

9. The support frame of claim 1, wherein the cage includes one or more legs, the legs and the base being operable to hold the support frame and its components on a support surface.

10. The support frame of claim 9, wherein a length of each of the legs is adjustable.

11. The support frame of claim 1, wherein the cage includes between three and twenty mounts.

12. The support frame of claim 1, wherein the cage includes at least four mounts.

13. The support frame of claim 1, wherein a height of the first camera is different than a height of the second camera and a height of the third camera,
wherein a height of the second camera is different than a height of the first camera and a height of the third camera, and
wherein a height of the third camera is different than a height of the first camera and a height of the second camera.

14. The support frame of claim 13, wherein at least one of the first camera, the second camera, and the third camera is positioned above the flat assembly, and
wherein at least one of the first camera, the second camera, and the third camera is positioned below the flat assembly.

15. The support frame of claim 1, wherein the stand and the cage are removably attached to one another.

16. The support frame of claim 1, wherein the stand and the cage are placed adjacent to one another without any physical connection.

17. The support frame of claim 1, wherein the cage includes a first pair of mounts that are aligned with one another about an axis parallel to a first axis of the flat assembly,
wherein the cage includes a second pair of mounts that are aligned with one another about an axis parallel to a second axis of the flat assembly,
wherein the cage includes a third pair of mounts that are aligned with one another about an axis parallel to a third axis of the flat assembly, and
wherein the first axis, the second axis, and the third axis are perpendicular to one another.

18. The support frame of claim 1, wherein the cage includes at least one mount with no camera interfaced therewith.

19. The support frame of claim 1, wherein the cage surrounds a perimeter of the flat assembly.

* * * * *